(12) United States Patent
Serageldin et al.

(10) Patent No.: US 12,159,248 B2
(45) Date of Patent: Dec. 3, 2024

(54) PLANNING SYSTEM USING SPATIAL-BASED VISUALIZATION AIDS

(71) Applicants: Mona Serageldin, Cambridge, MA (US); Daniel Tsai, Atkinson, NH (US)

(72) Inventors: Mona Serageldin, Cambridge, MA (US); Daniel Tsai, Atkinson, NH (US)

( * ) Notice: Subject to any disclaimer, the term of this patent is extended or adjusted under 35 U.S.C. 154(b) by 0 days.

(21) Appl. No.: 17/092,985

(22) Filed: Nov. 9, 2020

(65) Prior Publication Data

US 2021/0201232 A1 Jul. 1, 2021

Related U.S. Application Data

(63) Continuation of application No. 14/926,400, filed on Oct. 29, 2015, now abandoned.

(60) Provisional application No. 62/073,143, filed on Oct. 31, 2014.

(51) Int. Cl.
*G06Q 10/0631* (2023.01)

(52) U.S. Cl.
CPC .............. *G06Q 10/06313* (2013.01)

(58) Field of Classification Search
None
See application file for complete search history.

(56) References Cited

U.S. PATENT DOCUMENTS

| | | | | |
|---|---|---|---|---|
| 5,652,717 A * | 7/1997 | Miller | ............... | G06T 17/05 703/6 |
| 5,818,737 A * | 10/1998 | Orr | ............... | G06T 17/05 703/6 |
| 5,983,251 A * | 11/1999 | Martens | ............... | H04N 19/186 708/203 |
| 6,334,146 B1 | 12/2001 | Parasnis | | |
| 6,684,219 B1 | 1/2004 | Shaw | | |
| 7,174,301 B2 | 2/2007 | Florance | | |
| 7,746,343 B1 * | 6/2010 | Charaniya | ............... | G06F 16/9537 345/428 |
| 7,777,648 B2 * | 8/2010 | Smith | ............... | G06Q 30/02 340/995.1 |
| 8,655,629 B2 * | 2/2014 | Detwiler | ............... | G06Q 10/04 703/1 |
| 9,760,840 B1 * | 9/2017 | Tyagi | ............... | G06Q 10/06313 |
| 2002/0010572 A1 * | 1/2002 | Orton | ............... | G06Q 10/10 703/22 |
| 2002/0178179 A1 * | 11/2002 | Rosenblum | ............... | G06Q 99/00 715/210 |
| 2004/0030706 A1 * | 2/2004 | Evans | ............... | H04L 69/329 |
| 2004/0119759 A1 | 6/2004 | Barros | | |

(Continued)

OTHER PUBLICATIONS

Walz, Ariane, et al. "Participatory scenario analysis for integrated regional modelling." Landscape and urban Planning 81.1-2 (2007): 114-131 (Year: 2007).*

(Continued)

*Primary Examiner* — Darlene Garcia-Guerra
(74) *Attorney, Agent, or Firm* — Fish & Richardson P.C.

(57) ABSTRACT

A presentation, organizational and analytical system comprises includes an information database component that allows project specific ability to organize data and observations. A computer system constructs visual overlays of spatially mapped features, quantitative and qualitative attributes and produces an analytical framework where the attributes of any spatial location change in response to changes in the features of a context.

20 Claims, 29 Drawing Sheets

(56) References Cited

U.S. PATENT DOCUMENTS

| | | | |
|---|---|---|---|
| 2005/0132305 A1 | 6/2005 | Guichard | |
| 2006/0044307 A1 | 3/2006 | Song | |
| 2006/0047692 A1 | 3/2006 | Rosenblum | |
| 2006/0100912 A1 | 5/2006 | Kumar | |
| 2006/0271281 A1 | 11/2006 | Ahn | |
| 2007/0021955 A1 | 1/2007 | Tolone | |
| 2008/0065658 A1* | 3/2008 | Sharma | G06F 16/29 |
| 2008/0109759 A1 | 5/2008 | Stambaugh | |
| 2008/0215524 A1 | 9/2008 | Fuchs | |
| 2008/0270945 A1 | 10/2008 | Risch | |
| 2010/0066559 A1* | 3/2010 | Judelson | G08B 25/14 |
| | | | 358/448 |
| 2010/0217739 A1* | 8/2010 | Vajjhala | G06Q 10/06 |
| | | | 706/47 |
| 2010/0321391 A1 | 12/2010 | Rubin | |
| 2010/0332468 A1* | 12/2010 | Cantrell | G06F 16/29 |
| | | | 707/706 |
| 2011/0153368 A1 | 6/2011 | Pierre | |
| 2011/0214050 A1* | 9/2011 | Stambaugh | G06F 3/0484 |
| | | | 715/234 |
| 2012/0110087 A1 | 5/2012 | Culver | |
| 2013/0132375 A1 | 5/2013 | Jones | |
| 2013/0218890 A1* | 8/2013 | Fernandes | G06F 16/29 |
| | | | 707/736 |
| 2014/0019179 A1* | 1/2014 | Gosalvez | G06Q 10/063 |
| | | | 705/7.11 |

OTHER PUBLICATIONS

Ishii, Hiroshi, et al. "Augmented urban planning workbench: overlaying drawings, physical models and digital simulation." Proceedings. International Symposium on Mixed and Augmented Reality. IEEE, 2002 (Year: 2002).*

Yeh, Anthony GO. "Urban planning and GIS." Geographical information systems 2.877-888 (1999): 1. (Year: 1999).*

* cited by examiner

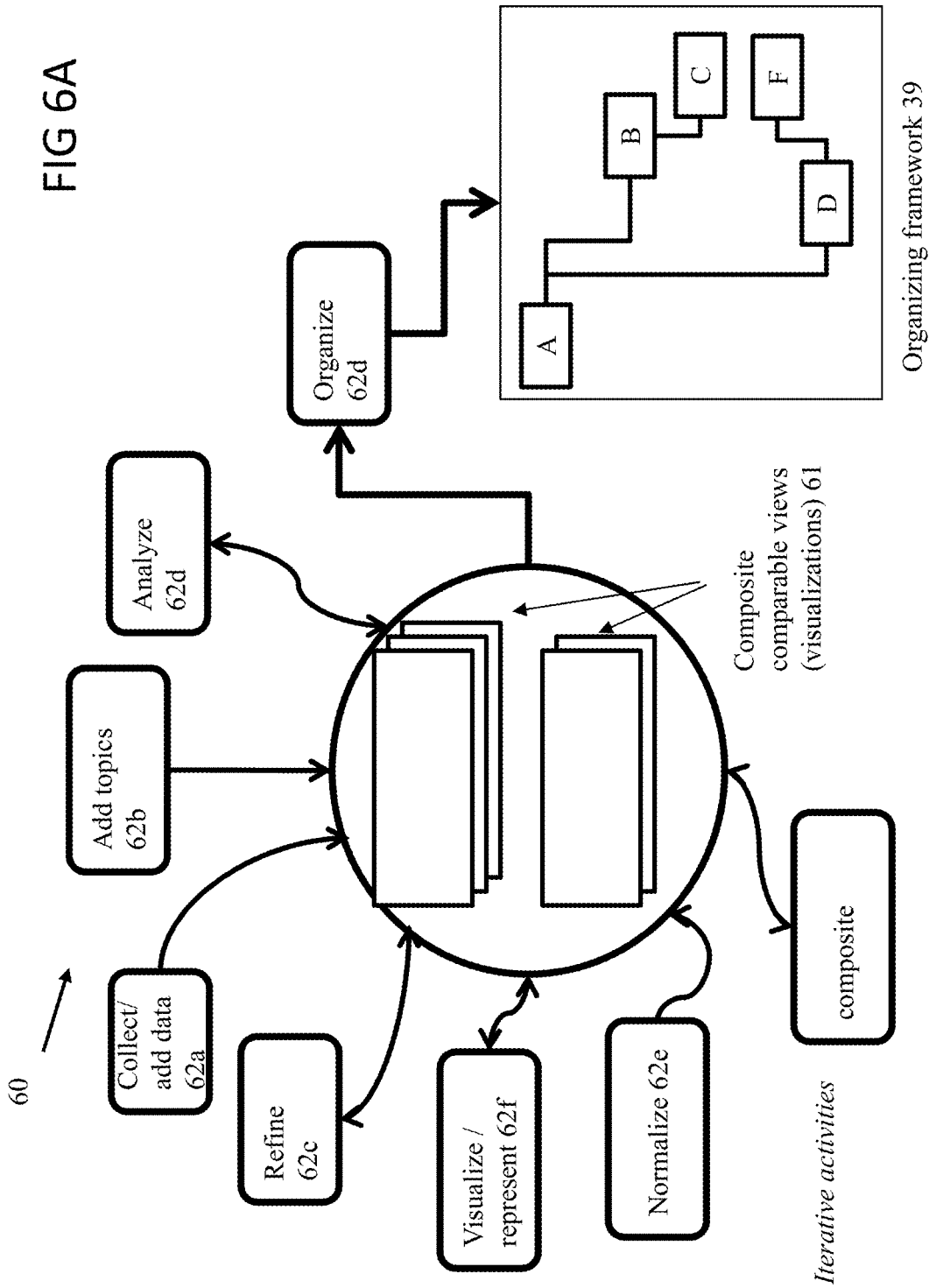

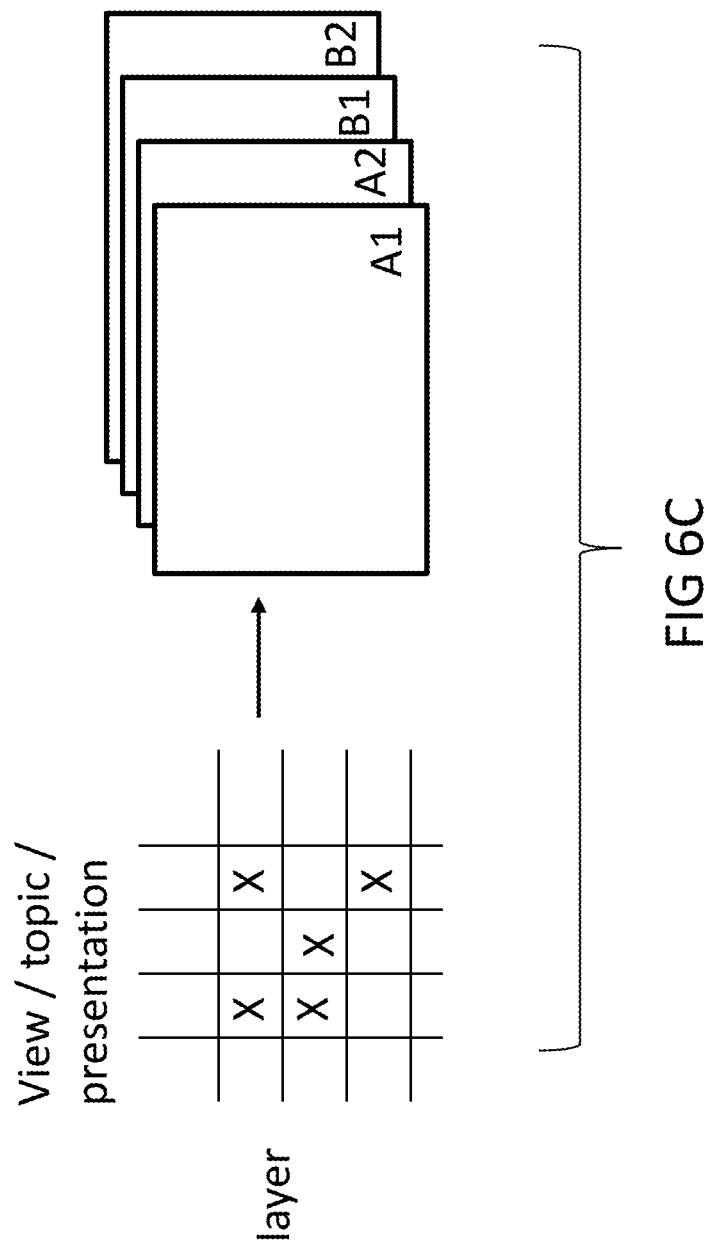

FIG. 13D

PLANNING SYSTEM USING SPATIAL-BASED VISUALIZATION AIDS

This application claims priority under 35 U.S.C. § 119 to U.S. Provisional Patent Application Ser. No. 62/073,143, filed Oct. 31, 2014, and entitled "Spatial Planning System", the entire contents of which is hereby incorporated by reference.

BACKGROUND

This disclosure relates to computer based visualization tools useful in various contexts such as planning.

One aspect of planning involves documentation and organization of data and observations, as well as analysis of existing patterns and trends. Worldwide, these tasks are becoming increasingly complex as a result of the increasing complexity of the world economy and the growing interconnections of the global economic and financial systems. Specialized organizations routinely make projections based on statistics and discovered trends that are interpreted by others to define impacts on projects being studied by the organizations.

SUMMARY

Disclosed is a computer implemented organizing framework structure stored in a database, and which is configurable for various contexts. The disclosed organizing framework structure is configured for spatial planning. The organizing structure can be configured for various other contexts.

According to an aspect, a presentation, organizational and analytical system includes a database that stores information including statistics, photos, diagrams, maps, qualitative data, and stakeholders inputs in different formats including observations and images, a computer system comprising a processor and memory coupled to the processor, executing a computer program that configures the processor to construct visual overlays of spatially mapped features according to quantitative and/or qualitative attributes, produce an analytical framework where the attributes of any spatial location change in response to changes in the features of a context, an organizing framework structure comprised as a hierarchy of planning units, with a top level being a project planning unit, with the hierarchy having lower level units for community section, existing conditions, and proposed development as second level planning units, apply smart planning units produced and attached to an organizing structure media/data base, and a problem/solution/scenario building mechanism in the visual comparison system.

The following are some features within the scope of this aspect.

The system includes a smart planning unit including a software object that contains planning information, template of information to be collected, audience allowed to view, add or otherwise interact with the information topics, and status connection to other planning units, tools for data collection, analysis, and presentation. The system is configured to apply visual/spatial comparison to provide two or more view ports to display of visual/spatial information side by side in the view ports and spatial synchronization of movement among the view ports such that movement in one port also moves the other port. The view ports are configured to show different layers in each view port as different visual aspects and detail differing scales in view ports show comparisons of features, with features shown in each view port can be spatial and context sensitive.

According to an additional aspect, a planning system includes one or more server computer systems, one or more databases operatively coupled to the one or more server computer systems storing an organizational structure hierarchy and with the one or more server computer system configured to execute a smart planning unit tool to produce one or more smart planning unit planning objects as an initial empty object, and instantiate and attached a populated smart planning unit to the organizational structure hierarchy with information, with the smart planning unit including a basic function that defines behavior of the smart planning unit and data required by the smart planning unit.

The following are some features within the scope of this aspect.

The system is further configured to generate queries to the databased to find in the organizational structure hierarchy, topical units of interest and interconnect found units to permit dynamic selection and arrangement of planning units. The system is further configured to display and interactive add planning data to the planning units. The system is further configured to filter dynamic arrangement of planning units by one or more of audience, topic, a spatial location. Each smart planning unit includes functions and data as default values to fit into the planning organizational structure. Each smart planning unit contains information passed on from a prior use of the smart planning unit. Each smart planning unit contains links to external resources. Each smart planning unit configures the server to disseminate information from the smart planning tool through channels.

According to an additional aspect, a planning system includes one or more server computer systems, one or more databases operatively coupled to the one or more server computer systems storing an organizational structure hierarchy and with the one or more server computer system configured to generate two or more images each image having a spatial visualization with layered information, synchronized the two or more images according to a spatial locations common in each image with each spatial view having as the layered information topical layers based on scale of the respective image and a topic of interest to the user.

The following are some features within the scope of this aspect.

The system when changing a view of one of the images is further configured to receive an indication to zoom in or zoom out on a first one of the two or more images, in response to the indication to zoom, constructing by the system a query to the corresponding layers in the organizational structure hierarchy for available data according to context and relevance of the data at the scale of the zoomed image and the topics relevant at the scale and to the scale of at least a second one of the images and topical layers.

According to an additional aspect, a computer implemented method of detecting spatial patterns includes producing by a computer two or more spatial visualizations with layered information that are synchronized to each other, iteratively comparing the two or more views at varying scales to detect inter-scale patterns of inter-related features, factors, effects, problems and solutions, and applying a highlighting identified inter-scale patterns of features, factors, effects, problems and solutions.

According to an additional aspect, a computer implemented method of detecting spatial patterns includes producing software objects that store planning information collected during a planning process, tagging by a computer meta-data of each unit by spatial location, topics, audience, and status, connecting by the computer units to each other to form an organizational structure of units by hierarchical or relational topics using one or more tools to assist in spatial reckoning, data collection, data distribution, and analysis, with distributing the planning units over a mobile communications network.

The following are some features within the scope of this aspect.

The units assist in inter-connecting units based on topic, spatial location, audience, and data features. The units include help tools to draw upon past uses of unit-subtypes for future use.

One or more of the above aspects may provide one or more of the following advantages.

While planning problems are multi-dimensional the above aspects provides a system and tools to deal with complexities of these problems. The system provides technological tools to assist in identifying drivers of change and analyzing implications of change. As multiple objectives exist in an urban development strategy and some of these objectives are mutually reinforcing while others involve incompatibilities, these tools visualize tradeoffs that may be made to deal with incompatibilities in planning objectives. These tools can assist in analysis of effects of different combinations of indicators and objectives to assess these trade-offs.

Indicators have a spatial dimension. Observations, statistics and indicators are generally only relevant to a specific location. Without a clear visualization of a spatial dimension an assessment of the meaning and significance of such observations, statistics and indicators is greatly diminished. As planning is multi-tiered, i.e., includes plural levels that relate to each other (e.g. GDP, regional, urban or rural settlements and specific subareas/sections/neighborhoods of cities and villages) Visualization tools are provided that produce a visualization of complex, composite multi-factored information. To define and prioritize planning actions, it is useful to map planning actions components and attributes to physical features and spatial dimensions of factors that may alter the physical features. The process of devising solutions to problems is aided by producing visual tools that map spatial dimensions to localized features and attributes.

The system is useful for early stages of project development when the project scope, focus, and information are being clarified; and for later stages when projects are well defined and are being implemented. The system addresses data disconnects, where data collection and use is at a stage where such data collection and use is not clearly defined, and the type of information is varied, including visual information, data of variable precision, material is speculative and prospective, and can be numeric, and statistical.

The system can produce customized presentations that are dynamically adaptive to audience, and can be non-sequential. The system provides tools for comparative visualization of complex, composite multi-factored information in a side-by-side visual manner. The system permits reusability of project subcomponents, with expertise and knowledge transfer, complex multi-factored research/planning, large scale distributed participation and use of mixed data types, precision, and complex data visualization.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 6A, 6B show flow diagrams of a spatial visualization process.
FIG. 6C is a block diagram showing relationships between views and topics for a presentation.
FIGS. 13A-13D show screenshot examples of user interfaces.

DETAILED DESCRIPTION

Figure 1:
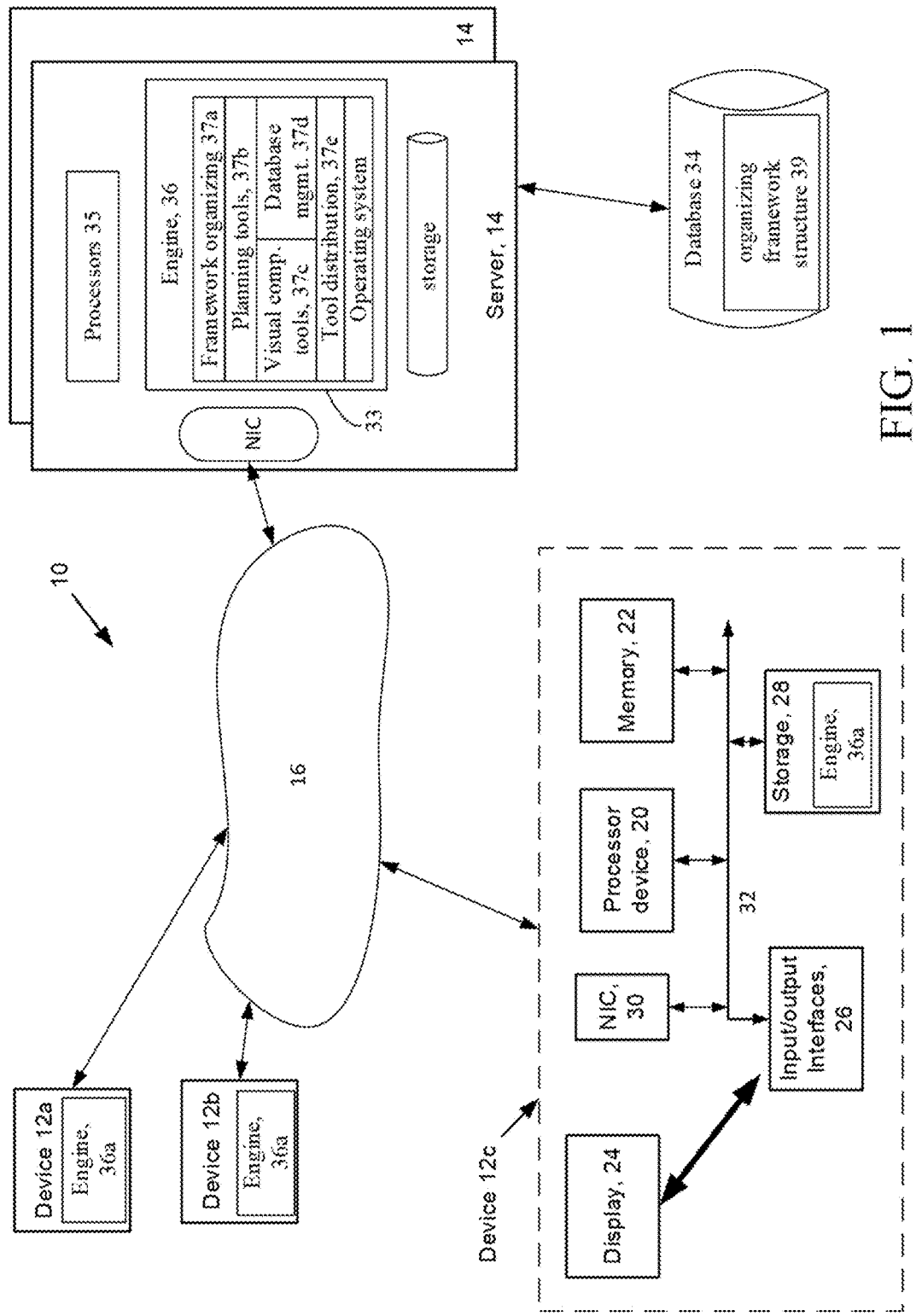
FIG. 1 is a block diagram of a spatial planning system.

Referring now to FIG. 1, a system 10 is shown comprised of plural, devices such as mobile devices, e.g., smart phones and tablet computers or desktop or laptop computers, etc. The devices 12a-12c of the system 10 typically include (as shown for device 12c) a processor 20, memory 22, and storage 28, with user interfaces 26 for devices (e.g., display 24, mouse, etc.) and network interface 30 all coupled via one or more buses 32 with a spatial planning engine 36 that runs on one or more servers (generally) 14 that is coupled to a database 34. Servers 14 execute the spatial planning engine 36 in memory 33, via processors 35. Client side engines 36a run on devices 12a-12c.

Spatial Planning system 10 includes smart planning units 37b for the use in the dynamic presentation and organization system and visualization tools 37c such as a spatial comparison tool. The spatial comparison tool produces a visualization of multi-topical/multi-factored data in two or more synchronized visual views, e.g., images that are of differing scope and informational composition. With this tool, planning problems, solutions, and factors that affect a spatial plan are visually identifiable. The spatial planning system 10 includes the spatial planning engine 36 that executes in memory 33 on the server 14 or in some instances devices 12a-12c. The spatial planning engine 36 is implemented in software, firmware, hardwired logic or other forms such as a co-processor or as a separate card or combinations thereof. The spatial planning engine 36 includes a framework organizing process 37a discussed below used for gathering project data and topics, etc., and storing in an organizing framework structure 39 in database 34, the smart planning tools generally 37b, as discussed below used to structure, fit and reuse/distribute, and integrate data and results of execution of planning processes. The spatial planning engine 36 also includes visual comparative tools 37c that execute visual comparison processes, discussed below for spatial comparison. The spatial planning engine 36 interfaces via database management 37d with database 34, and also distributes client side tools to mobile and/or fixed client devices via tool distribution 37e. The engine executes under control of an operating system.

The spatial planning engine 36 aids in spatial planning, organization and analysis of complex multi-dimensional problems. The organizing framework structure 39 gathers data into a database 34. Information is brought together and arranged into spatial representations that are compared and layered. The organizing framework structure 39 acts as a topical outline, and as data collection nodes. These nodes are filled with smart planning units that collect, connect, analyze and present information. Visual comparative tools are among the tools available to the smart planning units. The comparative visual tools assist in visual analysis where many factors impinge on problems at multiple simultaneous (spatial) scopes, and where patterns arise only by taking into account these multiple scopes. The database system 34 acts to collect, organize, and index the information as the information evolves from the distributed user devices. The distributed mobile tools are used by the smart planning units to manage, disseminate and collect information via distributed mobile personal communication devices.

Figure 2:
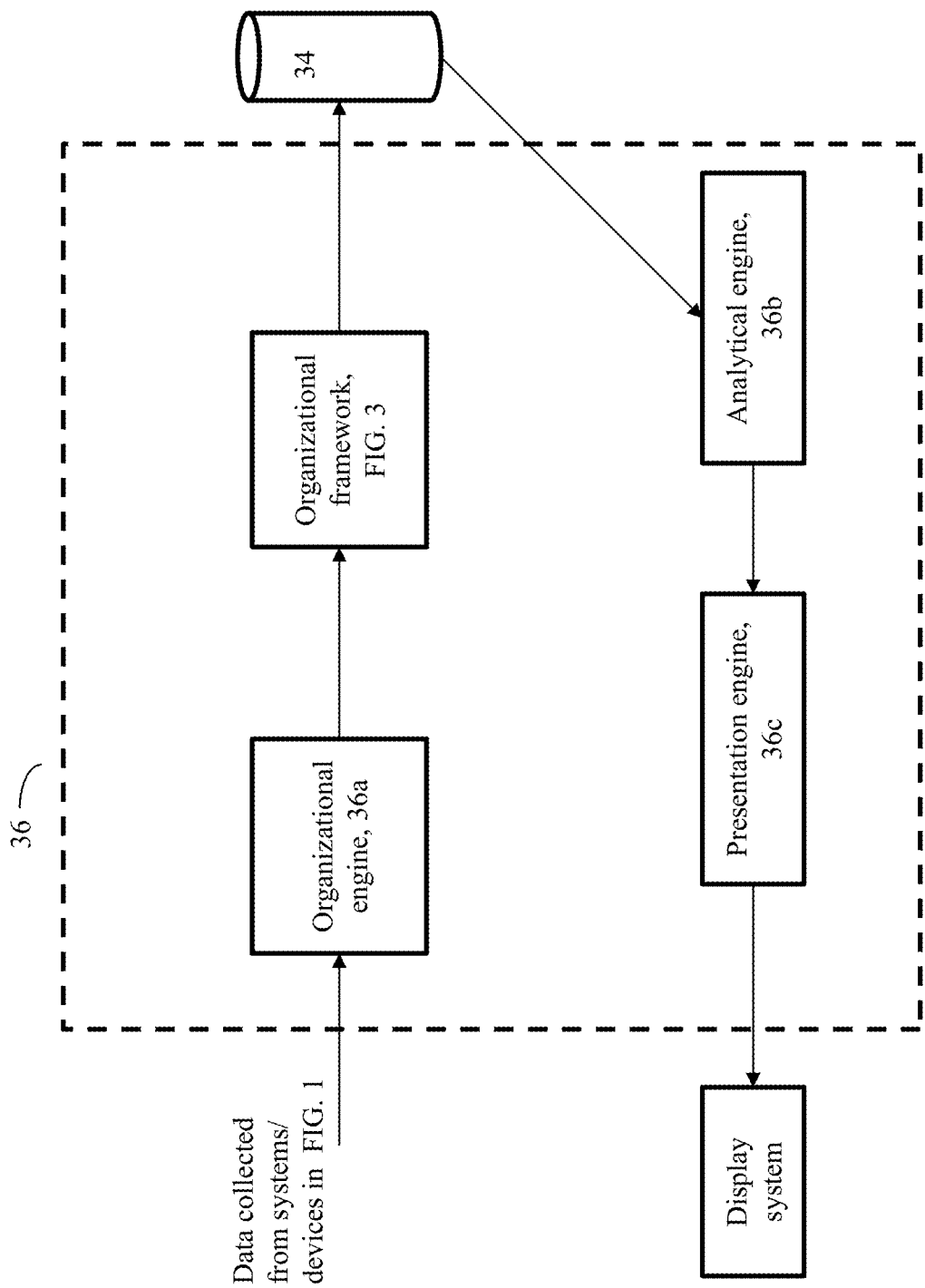
FIG. 2 shows organization/presentation/analysis functions in the system.

Referring to FIG. 2, the spatial planning engine 36 includes organizational engine 36a that produces the organizational framework structure 39 analytical engine 36b and presentation engine 36c, as shown. The organization engine 36a produces the organizing framework structure 39 from information fed to the spatial planning engine 36 as the information is gathered. The analytical engine 36b produces new information and representations from existing information, including statistics and visual representations. The presentation engine 36c of the spatial planning engine 36 forms traditional presentations (e.g. slide shows). In this manner presentations are sequential.

The presentation engine 36c in conjunction with the analytical engine 36b also produces presentations that are non-sequential and dynamically adjusted to fit different audiences and timeframes. Dynamic adjustments include searching and/or filtering of topics within the organizing framework structure 39 to produce dynamic views that are rendered as images, e.g., on a display device. A generalized characterization of the process involved in spatial planning includes presentation of information to various audiences; organizing of the information, designs, problems and proposed solutions; and analysis of information to produce new analytical representations and provide new proposed solutions and scenarios on which action plans are based. Presentations that are non-sequential are presentations that are selective, using customized search query paths through information stored in the organizing framework structure 39, and which presentations are based on interests and audience type.

Figure 3A:
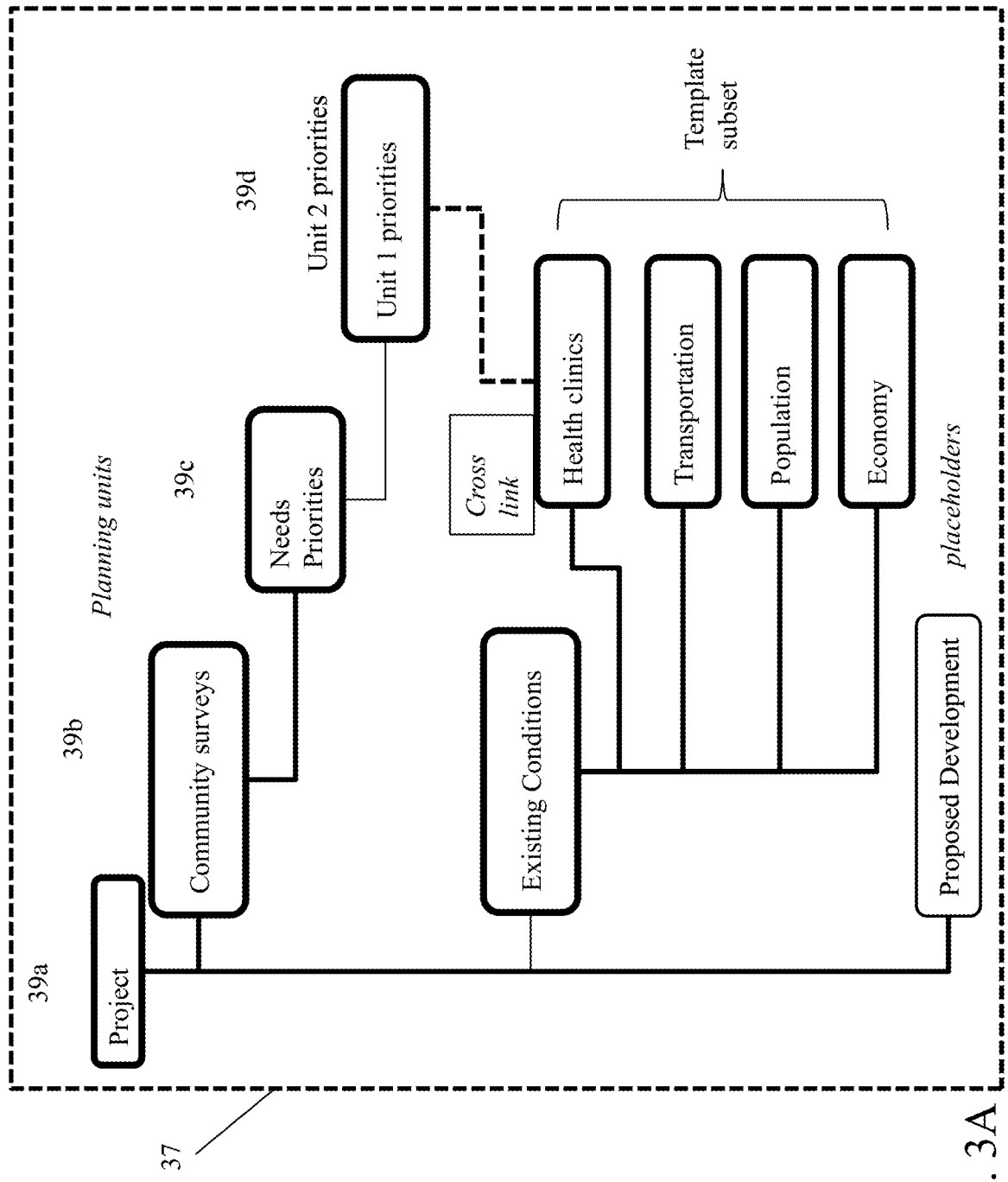
FIG. 3A shows flow diagram of an organizing framework/structure.

Referring now to FIG. 3A, the organizational engine 36a produces a dynamic organization of topical information (codified as smart planning units) arranged by topics. Presentation of topics is dynamically selected based on criteria including audience, length, complexity, spatial locality and topics of interest. The mechanism for producing the organizing framework structure 39 involves the organizational engine 36a organizing and cross-indexing the information, and inter-linking the information by one or more of a hierarchical, a relational, or another configurations to present multiple versions of the information based on the above criteria including audience, length, complexity, spatial locality and topics of interest.

The organization engine 36 produces topical nodes of information and the organizing framework structure 39 that is either hierarchical, relational, another configuration. The organization engine 36 produces a cross-index of the information and the organization engine 36 tags the topical nodes by the criteria audience, length, complexity, spatial locality and topics. The organization engine 36 includes a search mechanism that finds nodes according to the criteria and a combination mechanism that re-assembles found nodes and a presentation mechanism to organize information into a presentation component.

This dynamic organization of spatial planning information in the organizing framework structure 39 is based on search and re-assembly of planning nodes, and has the organizing framework structure 39 provided as a topical organizing structure that is formed by finding data nodes that fit specified criteria. These found nodes are combined based on node data and inter-relationships. For example, a standard slide presentation is typically sequential and one-size-fits-all, meaning the slide presentation is the same irrespective of audience. This, however, may not be suitable for vastly different audiences, such as an executive audience that, e.g., needs concise but advanced information, versus a public community that might like, e.g., detailed but non-technical information.

In FIG. 3A organizing framework/structure 39 is shown as a hierarchy of planning units. The top level is a Project planning unit 39a. In this example, a Community section, Existing Conditions, and Proposed Development are second level planning units 39b. The Community section has a sub level Priorities, which in turn have multiple sub levels 39c, 39d that are priorities per unit. The existing conditions section has sub levels of Transportation, Population, and Economy sections. A proposed development level is shown as a placeholder.

The organization engine 36 to produce the organizing framework structure 39 starts with either available data or topics (even without available data). The units within the organizing framework structure 39 are placeholders for information and further detail. Placeholders are important, especially for collaborative enterprises, by specifying a collective organizing structure for other participants to see, use, and fill in. Experts in one area may produce organizing structure (planning units) in one area, while others, such as a task force, may then seek to gather information.

The process can be distributed in a manner where users can produce, fill-in, and see the organizing framework structure 39 of planning units from mobile devices. A project staff member in the field can be alerted of a new "Transportation" planning unit under "Existing Conditions" and take field photos and data for that planning unit via a mobile device. Meanwhile, an expert in community involvement might browse the data under "Community/Priorities" and enhance and advise on the questions to ask. The organizing framework structure 39 is dynamically produced based on factors including audience; the desired length; the complexity of what is shown; the topics of interest; and the spatial areas of interest.

For example, (1) the presented material for an executive audience might be short, advanced in complexity, and on topics of cultural heritage, tourism and transportation, and focused on a particular region; (2) a presentation structure for a public audience, might be of unspecified length, but be non-technical in complexity, and be on economic development, education, and health, within local towns; and (3) a presentation for a working group might be of unspecified length, but be technical in complexity, and be topically about development corridors within a specified region.

Documents and topical units are tagged with such factors, which in turn are used to retrieve the documents and topical units from the database. While standard "presentations" are linear, i.e., material is seen in a sequence, the presentation of material in this system can be sequential or non-sequential, i.e., the presentation has multiple optional paths, and is dynamic in content based on these factors.

Figure 3B:
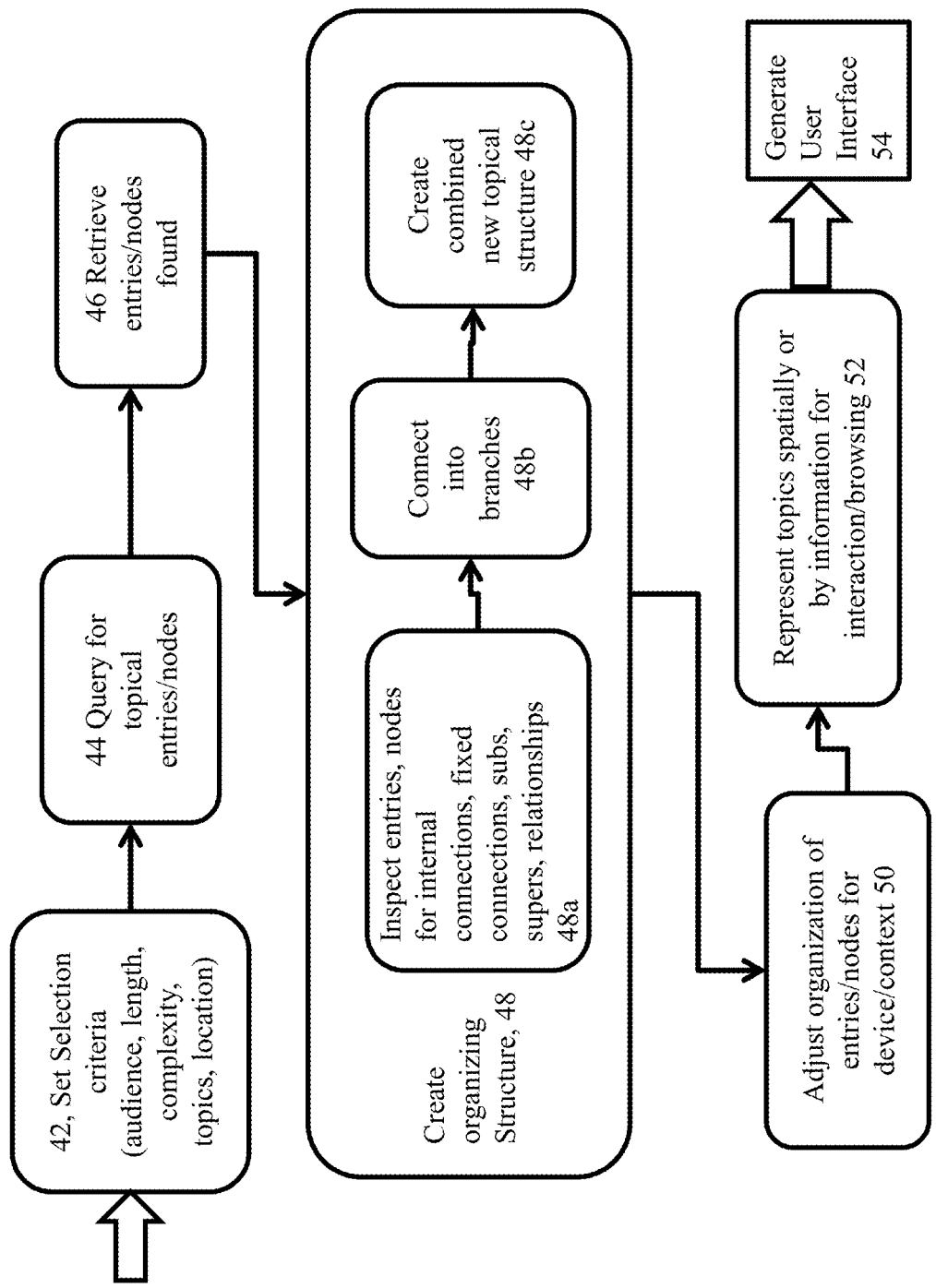
FIG. 3B shows dynamic topic structures.

Referring now to FIG. 3B, the organizational engine 36a searches the database 34 and produce the organizing framework structure 39 of FIG. 3A is shown. The organizational engine 36a receives 42 a set selection criteria for the various factors, such as audience, length, complexity, topics, and spatial area. The selection criteria for these factors use as criteria, data within the planning nodes, topical tags (metadata) for planning nodes, and structural relationships between topics and between instance nodes. Queries are generated and sent to the database 34 for documents and topical entries (and to be described planning units). The database 34 is searched 44 for entries matching the query criteria. These entries are retrieved 46. From the retrieved entries the dynamic organizing framework structure 39 is produced 48, by the organization engine 36 inspecting 48a the entries for internal connections, fixed connections, including subordinate and superordinate relationships or other relationships, connecting 48b retrieved entries into large branches, and combining 48c unconnected branches into the overall topical structure, i.e., the organizing framework structure 39. The organizing framework structure 39 can be a hierarchical tree structure or a networked structure. The organizing framework structure 39 is prepared 50 for the device and context and information is presented either as text information or spatial information that can be interacted with and browsed. The organization engine 36 produces a graphical user interface to display the information on either desktop or mobile devices.

Figure 4:
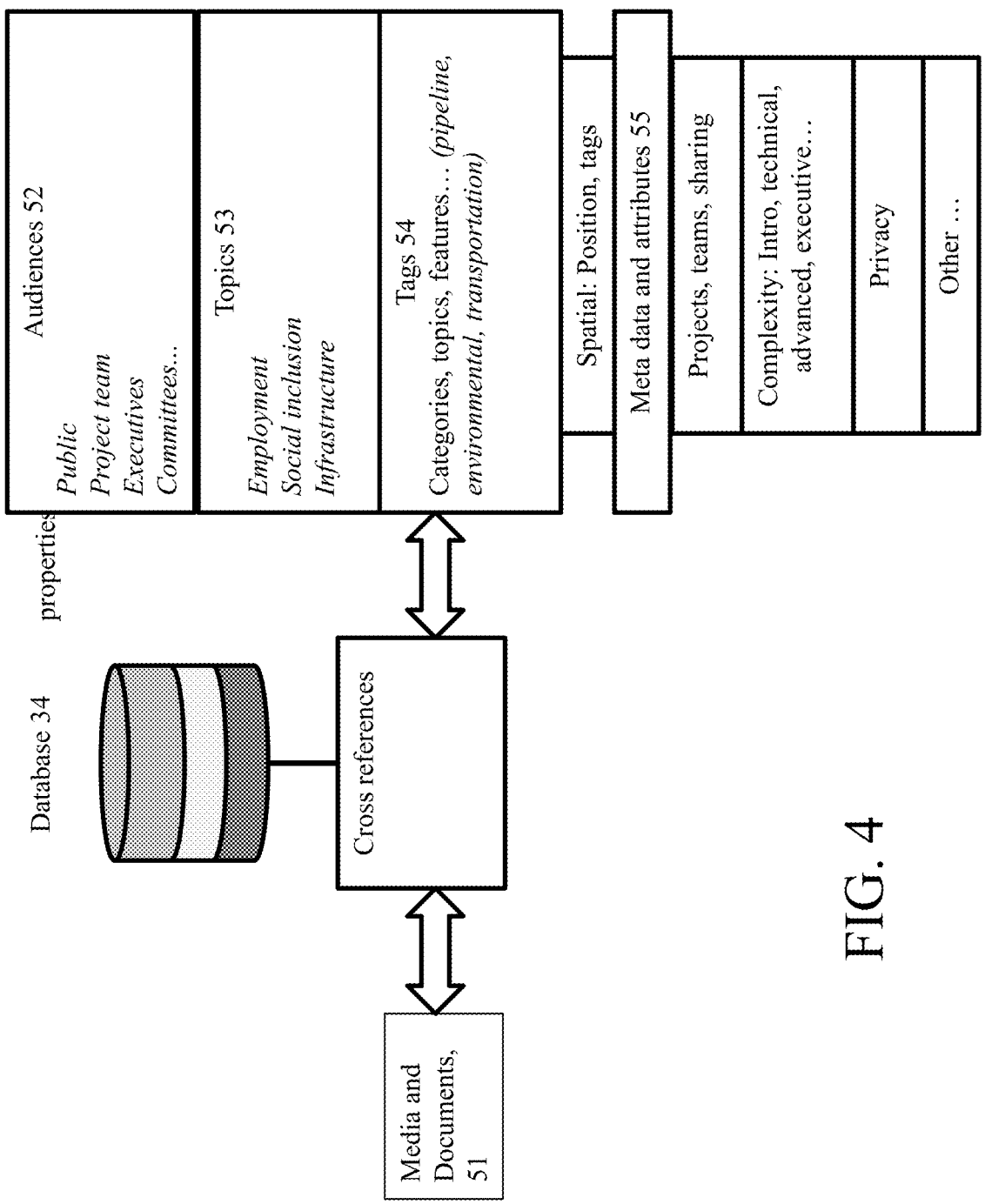
FIG. 4 shows a block diagram of a database structure.

Referring now to FIG. 4, the database 34 and organizing framework structure 39 are shown. The database 34 is a storage structure and a server structure that executes a database management program (not shown). The database 34 is a repository for the organizing framework structure 39 storing diverse media and documents, spreadsheets, lists, notes, aerial photography, site photos and maps (digital maps, 2d, 3d models and tables) 51. Planning data collection involves a diverse variety of media and documents from many sources. Information is often of different precision, format, and quality. Information can be in the form of spreadsheets, written lists, notes, documents, aerial photographs, site photographs, paper maps, digital maps, 2-dimensional and 3-dimensional digital models, and tabulated data.

The data is cross referenced with its intended audiences 52, ranging from project team members, to executives, committees, and the public. The data is also cross referenced by topic 53. Collected data is tagged 54 by keywords and spatial properties are assigned. Other meta-data and attributes can be assigned 55. Project related team assignments and sharing can also be recorded. The collection and data assimilation process helps to bring data in from disparate sources, and begin the exploratory process of understanding the problem space.

Figure 5:
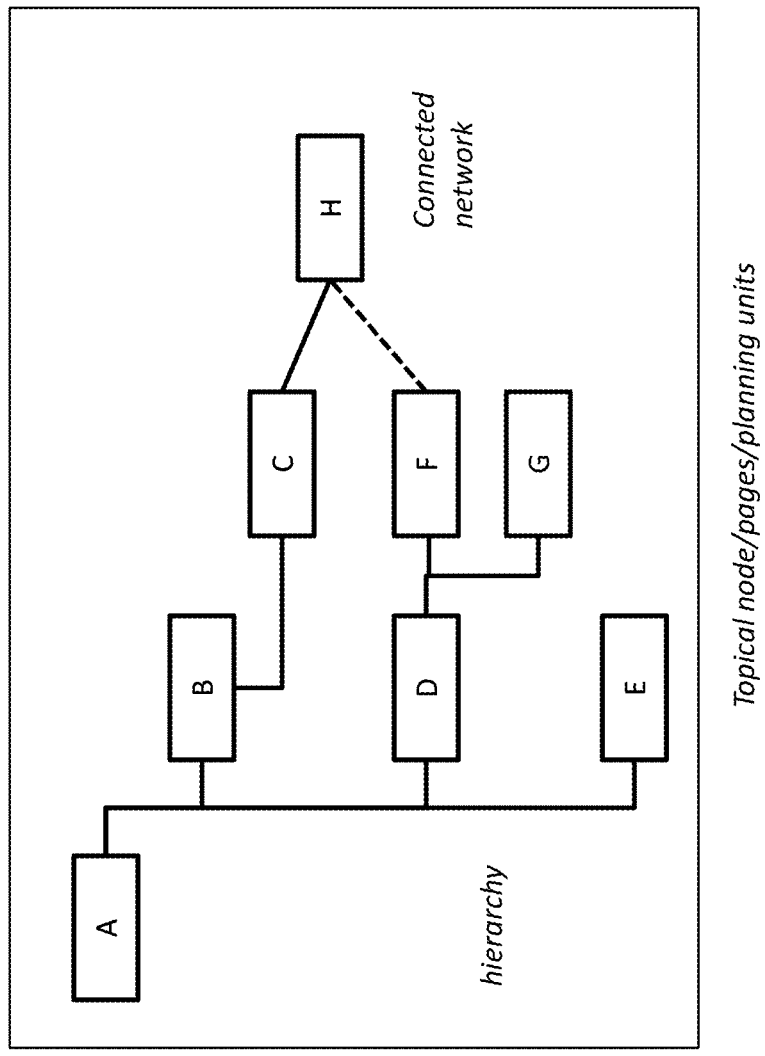
FIG. 5 shows a block diagram of a topic structure.

Referring now to FIG. 5, topics are organized in various configurations, such as in hierarchies and in networks. Early stage projects require use an open ended evolving outline or placeholder structures for topics as the topics are developed or discovered. Each topic in the organizing structure is a collection node for information.

In the topic structure figure, nodes A B D E C F form a hierarchy. Nodes C and F are both connected to node H, forming a network. Different sets of topics can be assigned to different audiences. Some users may not have permissions to see particular topics. For example, Node G may be for a different audience than the other nodes. Topics can also be searched and dynamically structured. Different subsets of nodes in an organizing structure provide multiple views of the same project based on audience, topic, and search attributes.

Referring now to FIGS. 6A-7D, a suite of spatial visualization tools are described.

In FIG. 6A, a general approach to a spatial visualization tool is shown. A multi-factored approach to planning involves taking into account information from a wide assortment of sources having different, often disparate, precisions, formats, and representations. Some information can be numeric and statistical, such as employment data, population statistics, social and health indices, etc., whereas other information is map-orientated, such as infrastructure data that may be either figurative or physical maps, rather than digital maps. Other information might be field oriented and come in the form of datasets, photographs, and notes. Planning is an interactive process, and thus the steps needed to arrive at a spatially oriented visualization 61 of information is likewise iterative. As data is collected/added 62a, topics are added 62b, and refined 62c as well; information is analyzed 62d, complex data is 'normalized' 62e and converted into visual representations 62f that can be interrelated. The organizing framework process 62d stores the topical information as it evolves in an iterative process in the organizational framework 39.

Figure 6B:
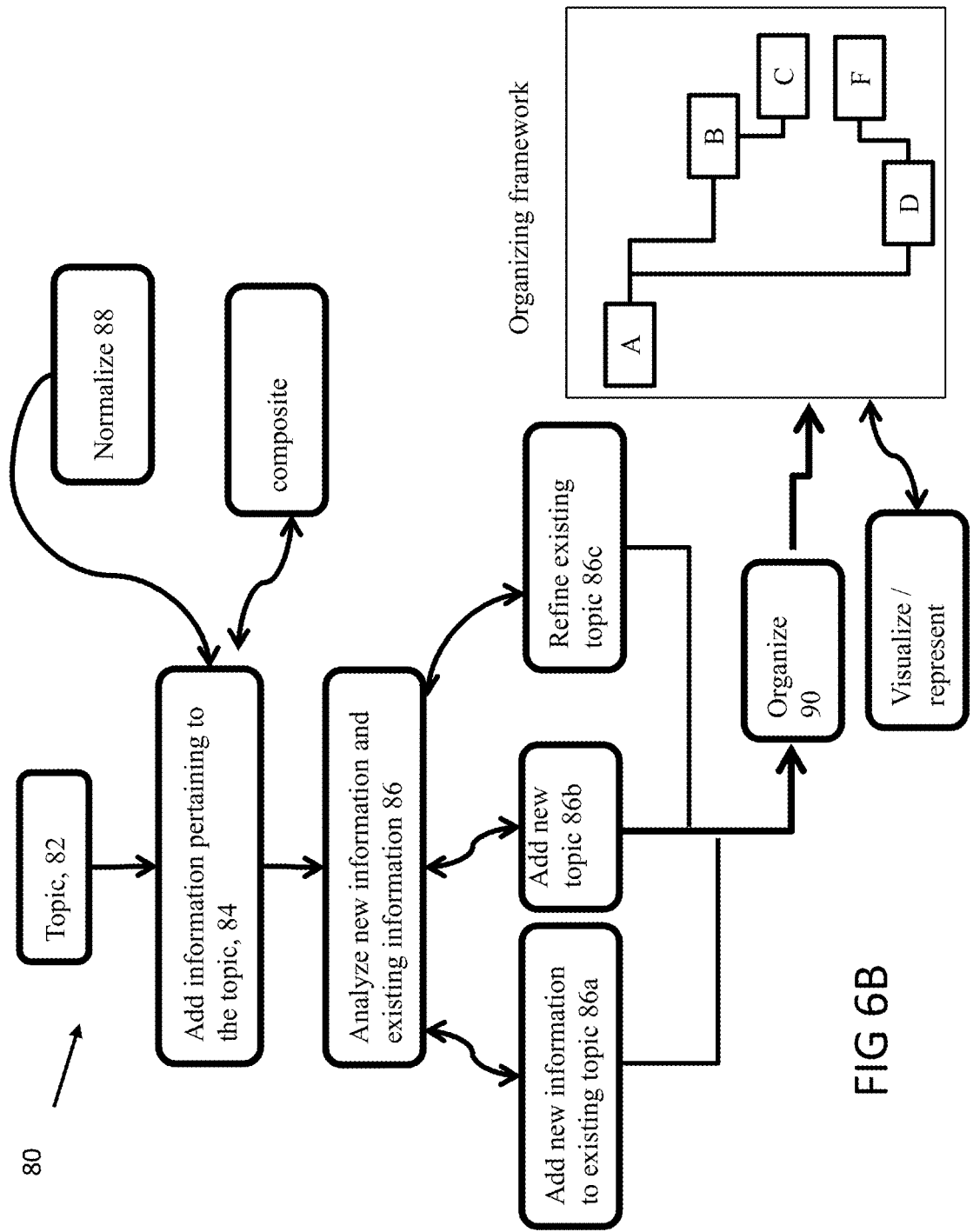

Referring now to FIG. 6B, generally the spatial visualization tool 37c executes a spatial visualization process 80 that assembles multi-factored information for presentation into a spatial realm. The process 80 is iterative. Given a topic area 82, new information is collected 84 and the new information along with any existing information on the topic is analyzed 86. Part of the analysis determines whether the new information is added to the existing topic 86a, or whether the new information is for a new topic 86b, or whether the new information results in existing data being refined 86c, and which can result in a new search for additional data.

Thus, as shown analysis 86 of information results in different representations and versions of the information. A given topic can lead to producing a new subtopic or, as shown the spatial visualization also produce a composite of new topics, that is, a grouping of related topics. Visual representations are important as by-products for presentations to audiences that can result feedback and further refinement.

In the spatial visualization process, information is also "normalized," 88 that is, information is placed at a common scale so that the information can be visualized, and different types of information can be compared together in a visual manner. Spatial normalization includes producing maps and other 2-dimensional and 3-dimensional information that are connected with a common spatial orientation and size. Spatial normalization also involves making spatial information coherent in terms of precision, and represented as overlaid layers of information.

The spatial visualization process organizes 90 information into topical, spatial groupings that fit into the planning organizational structure within topical planning nodes. As an exemplary explanation of the spatial visualization process, topics, such as nature reserves, cultural sites, infrastructure, housing density, etc. are planning topics. Information for these planning topics is collected.

As shown in FIG. 6C, the spatial visualization process 80 (FIG. 6B) produces layers A1, A2, B1, B2 of spatial information (representations) that may pertain to one or more topics, views, and presentations. The spatial visualization process 80 normalizes the multi-factored information into spatial and/or visual information to produce compatible layer sets, e.g., layers A1, A2 and B1, B2, as shown. These layer sets A1, A2 and B1, B2 of information pertain to particular composite views, which in the context of planning are issues at two or more of local, regional, national or international levels.

Figure 7A:
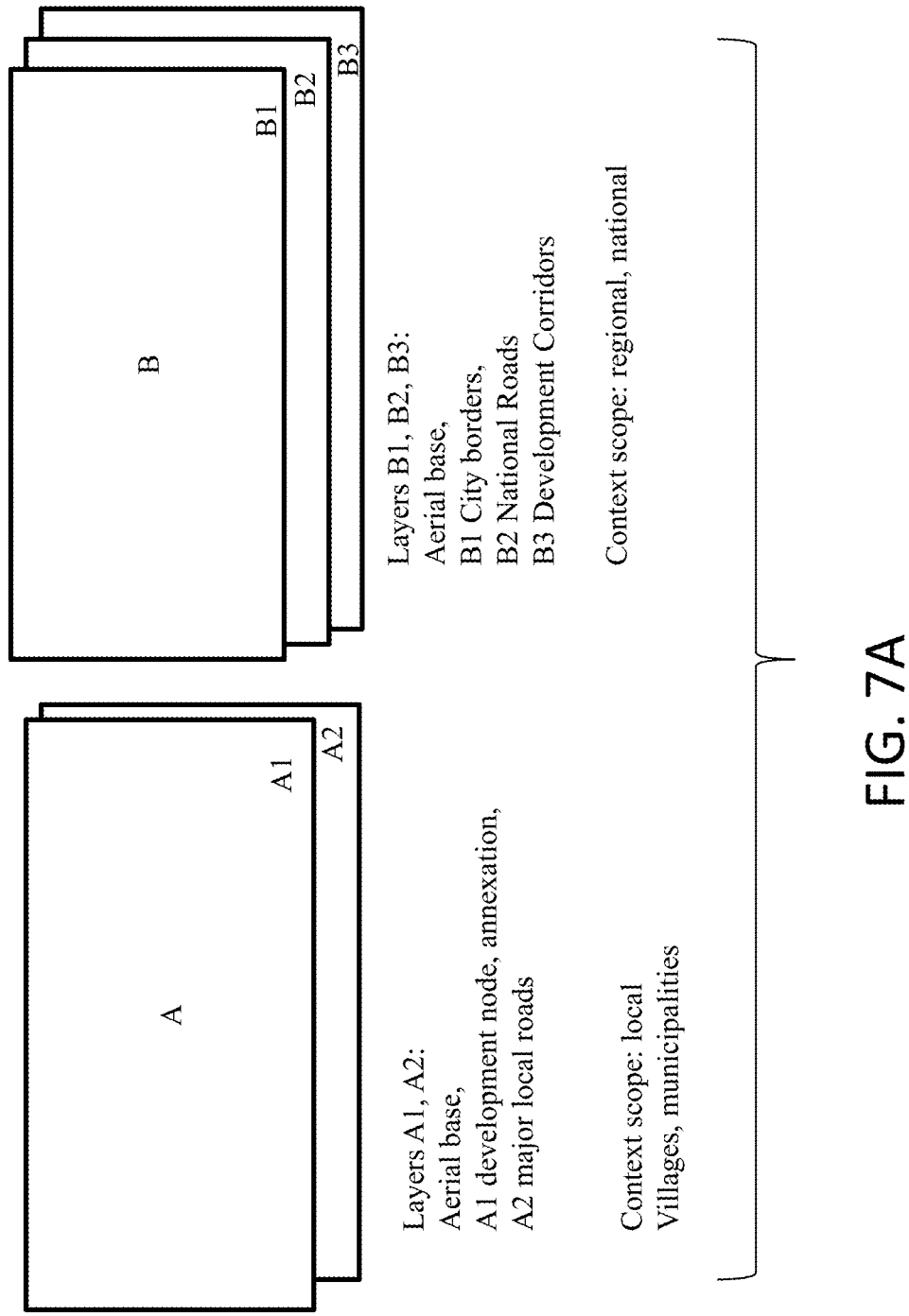
FIG. 7A shows a block diagram of differentiated spatial comparisons.

Referring now to FIG. 7A, a specific spatial visualization tool is a differentiated spatial comparison tool. Differentiated spatial comparison involves use of a visual tool, the differentiated spatial comparison tool provided by the system 10 permits a visual differentiated comparison. The differentiated spatial comparison tool involves matching two (or more) views together. The differentiated spatial comparison tool includes spatially synchronizing the two or more views, meaning that movements in one view result in a corresponding relative synchronized movement in the other view(s), the relative synchronized movement being relative to scale and topical information (layers).

For the basic case of two views, one view is different from the other view in terms of the visual layers (in the example, View A has layers A1, A2 versus View B has layers B1, B2, B3), and one view is zoomed in at a different level than the other (in the example, view A is "zoomed in" compared to view B).

However, in FIG. 7A each view is not merely a zoom in/out of the other view. In FIG. 7A, the information represented in each view is sensitive to the spatial zoom context and the topical context. The views offer a dynamic spatial context zooming function where the two (or more) views are synchronized to enable a synchronized visual comparison of the two (or more) spatial visualizations with each having layered information. The spatial locations are synchronized to each other for panning movement and each spatial view has topical layers based on scale and topical interests. Zooming changes the query for data based on available data at the scale and topics relevant to the scale and to the other views. For example, with 2 or more comparative views, for one view A, a (pseudo) query might be:

select topicdata.*where context in ('local', 'municipal', 'public services') and location=$thislocation this query answer returns topics that can be resolved into specific data sets or visual layers, such as {topic, dataset records} {'schools', 'dataset1'}, {'bus routes', 'dataset2'} for further processing.

meanwhile, for comparision view B, select topicdata.*where context in ('regional', 'population') and location=$thislocation returns records with {topic, datasets} such as {'population density','dataset100'} and {'new housing', 'dataset101'}.

In the example, View A could show spatial data of local, municipal, public services such as schools and bus routes. In contrast, View B could show for the same area, zoomed out, regional population in terms of population growth and new housing. The differences of context and queries can be set by general or custom rules.

For planning, this can mean that a zoom-in to a street scale shows urban level information (layers), such as streets, buildings, sewer and water lines, housing information, commercial and residential information, and in contrast, the zoom-out view shows a larger urban, regional, national or supra-national information, depending on the zoom-out scale. For example, the zoom-out view can show urban/rural boundaries, rivers, regional, national or trans-national roads, environmentally sensitive areas, etc. This is different from just "levels of detail" in part because View A and View B are not merely more levels of detail for zoomed-in views, but different information per zoom in view and context. The differentiated spatial comparison shows spatial information at two different scales so that information, which may only be revealed in contrast between tow views can be obtained, i.e. the (visual) analysis requires contrasting simultaneous viewpoints.

For example, View A is at the city scale, where urban expansion can be seen in terms of roof tops, local roads, etc. View B is at the regional and national level, where urban growth can be seen in terms of housing density, growth pools, migration/movement of people, and possibly patterns of urban expansion, that is, the movement of population from one region to another (growth in one location, shrinkage in another location). The two views are of different information and are essentially coupled together views by the differentiated spatial comparison tool. While the zoom-in shows selectable detail (layers), the zoomed out may show patterns. Conversely, patterns when zoomed in, identify what the basis is for the pattern.

Identifying patterns is used to produce analytical visualizations. Patterns can often be detected at a particular scale, such as regional scale, but not local scale. Patterns can also be detected in contrasting comparative scale, e.g., local properties found to also occur in frequency at larger regional scales, for example. Patterns can be identified by humans as well as by computer recognition. Identification by humans can include experts, field personnel that observe something, as well as the general public. Computer recognition algorithms can aid in recognition of spatial features such as house roof tops, geological formations, changes from one time to another, for example. Computer recognition systems can also be trained to improve by human example.

For example, depicting a ground formations at a zoomed-in scale, crevice formations might be erosion or seismic faults. However, when viewed together with a zoomed-out view the crevice formations might line up and be consistent with the discovery of a secondary geological hazard or fault line connected with a primary fault line. Large scale fault lines may cross national boundaries. By pairing comparative views the system can be used for analyzing seismic fault lines, weather patterns, and climate change (in addition to spatial planning) impacts that cross local or regional boundaries. Put another way, at a local scale, one might not know what super-structure or super-system is involved with a feature or information, whereas at a large scale one does not know what local implications are for a large scale feature. However, by using the differentiated spatial comparison tool placing the two views together either in contrast or pair-wise synchronized comparison.

Figure 7B:
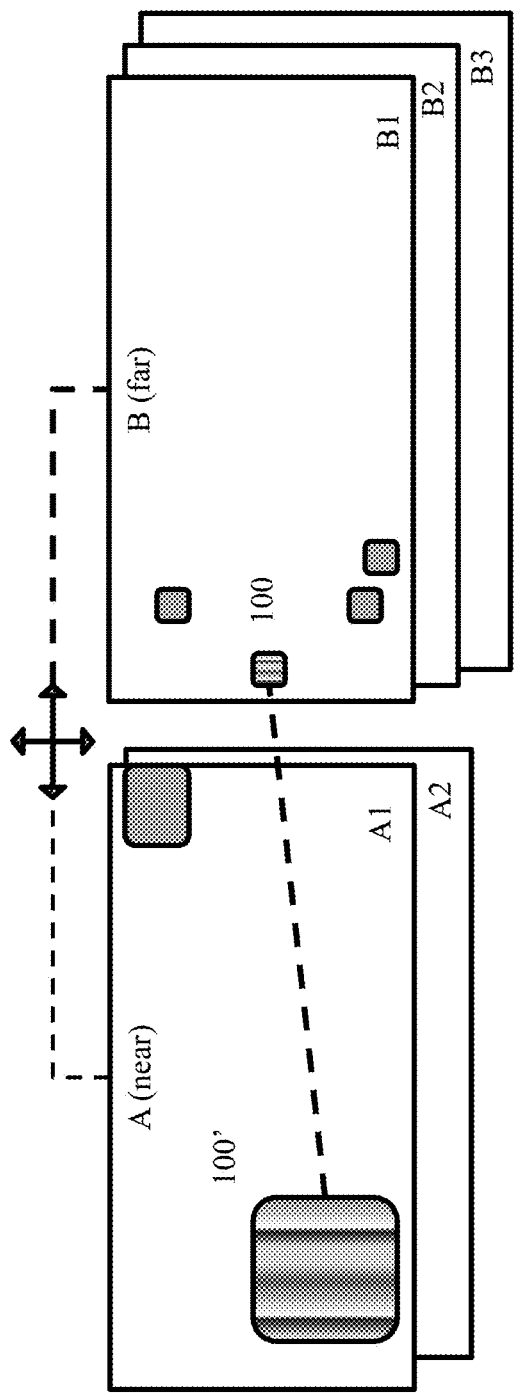
FIG. 7B shows a comparative spatial visualization.

Referring now to FIG. 7B, aspects of a comparative spatial comparison tool 110 are shown. The comparative spatial comparison tool is a comparative scale tool that shows the same object/geographic location in from two viewpoints. In FIG. 7B, there are two views each view comprised of layers, with View A, the near view, comprised of two layers and View B, the far view, comprised of three layers. In some embodiments, there can be more than two views at a time and each view can have various number of layers. These views are rendered as overlaid images on a display.

In FIG. 7B, the two views are at different scales. For example, the view on the left is zoomed in from the view on the right. Each view can have the same visual layers or can have different layers based on interest and context. For example, the zoomed out view on the right can show features, e.g., feature 100 relevant at a regional or national scale, while the zoomed in view on the left shows features e.g., feature 100' (a version of feature 100) relevant to a local context. Interacting with the view, such as scrolling the view moves the companion view(s) in synchrony. The paired (or multiply-coupled) views are not simply "magnifying views", but are synchronized views at different scale and features, which is advantageous in planning, that is to observe a place (a space), simultaneously in different ways and scales with differing information/contexts. This allows planners to understand and reconcile planning issues at different scales and contexts. For example, a new road may be viewed as a good fit at a regional scale, but at a local scale, the existence of the road will present problems of various types such as crossing erosion zones and sensitive migration areas. Conversely, a scheme to put a new transportation center (terminal multimodal station) may look good at a local scale, but not fit a national transportation plan. These problems are more easily identified by use of the visual comparison tool. The visual comparison tool uses two (or more) spatial views, with each spatial view comprised of overlaid data layers, and with each spatial view related by location. The views can differ by layers and by scale, with browsing one view produces concomitant changes in the other view(s) in a synchronized manner. Zooming for instance produces changes in the layers based on data and contextual zoom rules. Contextual zoom rules can be general or customized per user and use. A general rules associates topics and scales. For example, for an overall topic "environmental", zoom-out (large scale) topics could include "ecosystem", "migration", "forests", "aquifer", "human activities". For the same overall topic "environmental", the subtopics could be "bird nesting", "protected plants", "housing", "commerce" and "road".

A second rule might associate large scale "transportation" with trans-national air travel, highways, national vs. international airports, etc. while local scale "transportation" is related to highways, local roads, bus routes, etc.

The association of topics and scales and spatial location can be used for further querying and retrieval of data. The main purpose is to retrieve information that is available and relevant to a general topic(s) of investigation, but relevant to the scale and other contextual factors.

Spatial scale levels can be characterized from small to large in terms of local, regional, national, international and global. These general scales are useful both as guidelines and also as scales at which governments and people operate at. Topical areas can map to these scales in different ways. Climate change, for example, is a global issue that translates into effects at the local level, such as in rain fall, and at the regional level as river basin properties or national agriculture output. Not all areas and topics at all scales need be considered equally. The spatial information for topical areas also has differing availability. For example, recorded data may exist in one spatial area and not another, or about one topic and not another. Ultimately, the available data and information-that-needs-to-be-collected feeds what can be shown and studied, such as via the comparative spatial tool. The organizing framework is useful in laying out what the topics are and launching endeavors to collect and structure data/information for each topic.

For any given view, a set of controls are provided, here shown as arrows. In this example, these controls correspond to factor, effect, problem, solution. The factor controls are tagged by a human and/or automated algorithmic processes such as image recognition of roof tops to study housing density. Factors may be identified within one layer of spatial data and later combined or overlaid with other layers of data. Factors include climate change, migration, seismic activity, etc. Effects of climate change may include water level rise, weather pattern change, increase population, changes in animal populations, informal settlements. Visualization helps identify, by example, the characterization and existence of factors and effects. Rather than merely using visualization as a communicative medium, the system uses visualization as in addition a design/analytical medium.

Factors are related to effects. Identification and analysis of factors and effects may be qualitative and quantitative, as well as conceptual. Within the system, factors and effects are identified and worked on independently and then linked by the system. Linking between factors and effects, problems and solutions, can be done manually as human assertions (e.g. this is a factor and that is the effect, such as "this (selected data) is the factor increased population, and that (selected data) is the effect of increased housing". The linking can be done interactively by a computer linking a user indication of objects as identified by (spatial location, topics, etc.) that resolve to particular datasets. The computer tags the object as a "factor", tag another object as an "effect", and associates the two tagged objects. The linking can also be done by computer search and matching of defined "factors" and "effects" within or among spatial areas. The coupling of factors and effects, such as a seismic fault zone with built structures, for example, helps spatial articulation of complex, conceptual issues. Problems subsets of factors and corresponding effects within the system are spatially provided. The identification of a problem (by human expert or computer algorithm) then can lead to (spatial planning) solutions.

As each view is composed of multiple overlaid layers that represent various topics and features, each view layer has spatially represented objects. The views A, B are spatially synchronized but are of varying scope, such as, from small to large: local, regional, national, supra-national, and global. Factors are identified as existing in the views (A, B). These factors are related to effects in the views (A, B). Problems are identified on the views (A, B) and solutions to problems are proposed to solve problems shown in views (A, B) or alternative view (C) of different scope and location. The factor to effects and problem to solution relate different views (A, B), topical Layers (A1, B1) and objects (100', 100) thru these controls used by users via mobile devices and/or machines.

Use of the comparative spatial comparison tool involves an iterative process that aids a planner by showing two or more views of selected information and inter-relationship of information between these two or more views (e.g., view A view B). With large datasets and large multi-factor problems, the computer implemented comparative spatial comparison tool helps a user explore, understand, and solve problems.

Figure 7C:
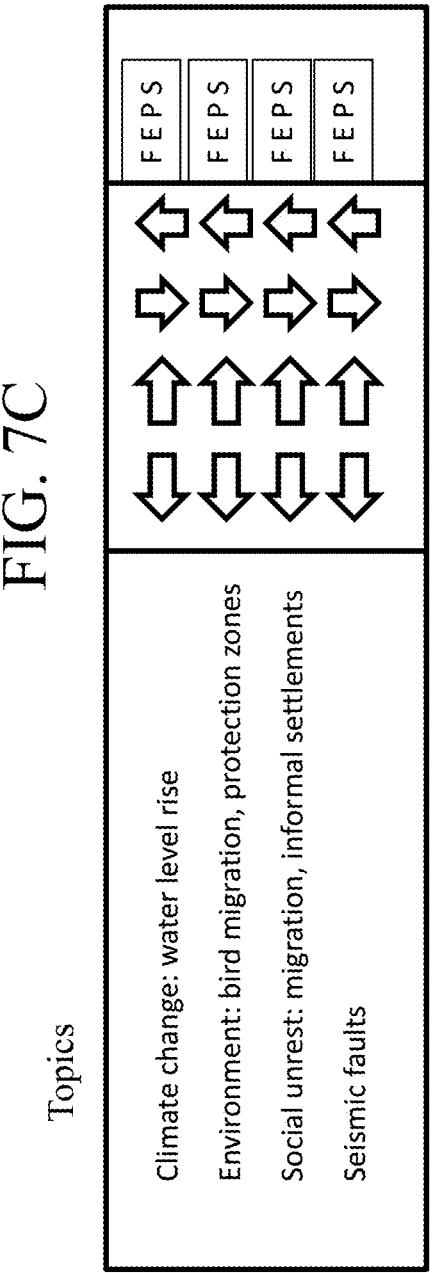
FIG. 7C shows spatial levels, topics, and representations.

Referring now to FIG. 7C, a list of stress factor/effect and problem/solution topics are shown. Arrows for each list item can be used to highlight or identify stress factors/effects or problems/solutions that relate to a higher or lower scopes. For any given set of views, selecting an arrow can search for and show factors/effects, problems/solutions or other related information from or to the selected scope (arrow). Scope therefore is scale plus topics (factors) relevant to the planning activity, and which are resolvable into spatial terms. For example:

Environment (waterways, aquifers, geological formations, animal habitats, ecosystems)

Infrastructure (pipelines, roads, electrical transmission lines, ports)

Housing (houses, roads, schools, hospitals, marketplaces, local transportation, fire stations)

Economic (trade zones, borders, ports, international vs. national airports, commercial areas, industrial areas, agricultural areas)

Each of these topic/factors can (a) be quantitative or design/qualitative; and (b) be mapped spatially after differing degrees of processing. However, or in addition, various topic/factors have different relevance on (a) spatial scale (b) activity of interest (c) other topics. Examples:

|  | Micro scale examples | Macro scale examples |
| --- | --- | --- |
| Economy | market place, factory | int'l trade zone |
| Environment | rare plants, crack in ground | aquifer, ecosystem, seismic zone |
| Transportation | bus route | trans national highway |

Activity of interests could be one or more, such as seeing economy and environment together in "zoomed in" micro or "zoomed out" macro scales. Also, topics can be related to each other, such as housing, public transportation, and commerce (jobs)

The multi-view, multi-scale/topic construct visually, spatially shows and allows dynamic interaction to investigate multi-factored problems and solutions. For example, conflicts (problems) of placing a commercial zone (micro/local) too close to a protected ecosystem (macro); building houses (local) near a seismic fault (macro and micro); planning increased agricultural jobs when urban influx/migration seen in demographics is prevalent, and high unemployment of educated youth is also prevalent (suggesting urban high tech jobs over farming). More specifically, selecting a button for Factor, Effect, Problem, or Solution can show incoming or outgoing relations.

Figure 7D:
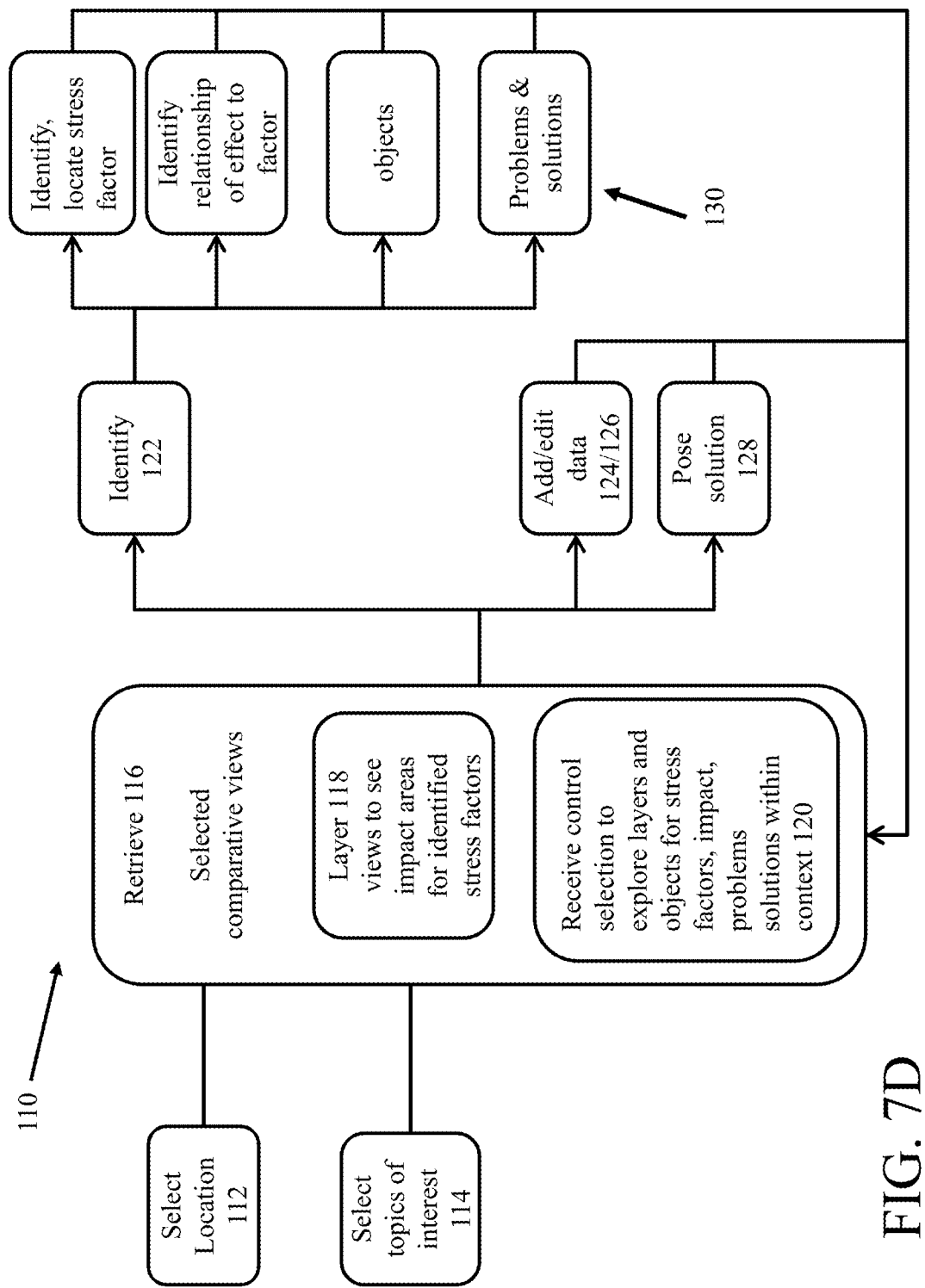
FIG. 7D shows comparative spatial visualization of inter-relations.

Referring now to FIG. 7D, the comparative spatial comparison tool 110 is produced by the computer system receiving 112 a selection of a location and a selection 114 of topics of interest. The system accesses the database 34 and in particular the organizing framework structure 39 and retrieves 116 those available spatial representations relevant to the selected location and topics of interest. These representations of data are layered 118 into plural views according to location and topic that will be rendered in views of differing scope. For any given view, a set of controls are provided, here shown as arrows in FIG. 7C. By selecting an arrow a user can search for and show 120 factors/effects, problems/solutions or other related information from or to the selected scope arrow. More specifically, selecting a button for factor, effect, problem, or solution shows incoming or outgoing relationships.

User exploration 120 via controls of the spatial information involves a user panning, resizing, and inspecting the spatial information shown. The user can identify 122 and locate objects, stress factors, and relationships between a factor and an effect. The user can alternatively add 124 or edit 126 data. The user can also pose 128 a solution to a problem. Tools (to be described) can be used to aid in the identification of problems and solutions. The user's actions are stored 130 according to whether the actions identified or located stress factors, identified a relationship or an object or posed problems/solutions.

The process returns to exploring the comparative view after identification, editing, and solution posing. This can cause a change in views to allow a user to observe where stress factors are coming from and where impact effects are being produced, and thus also to observe where problems are arising, where solutions are being posed, and also where similar conditions exist.

Figure 8:
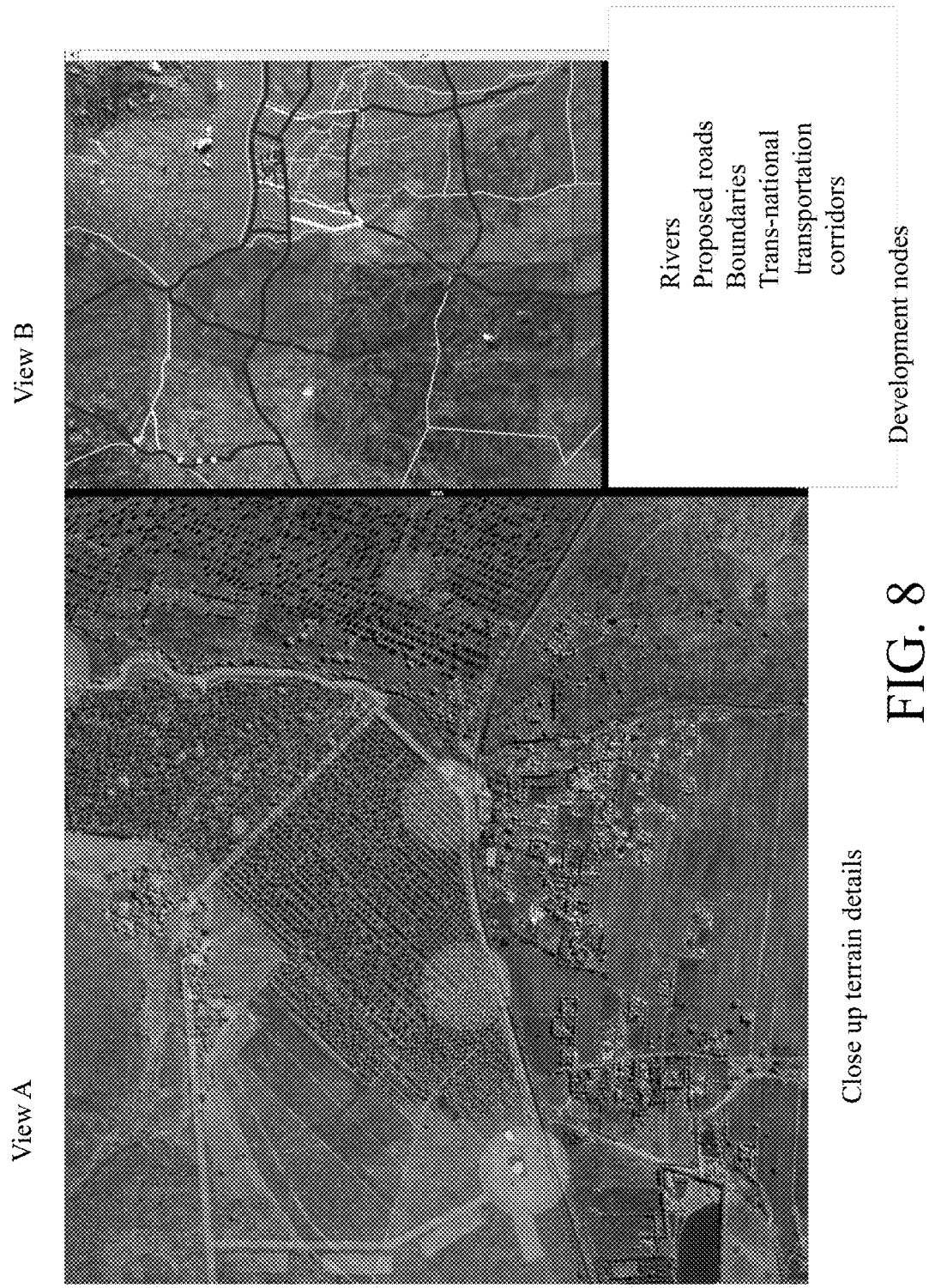
FIG. 8 shows a spatial comparison tool example.

Referring now to FIG. 8 an example display rendered on a display (or two display devices) shows a user interface that renders results of use of the comparative spatial comparison tool. The display(s) of the planning system render side by side comparative maps, where each map is synchronized with the other, but can be separately zoomed in or out spatially. The layers used to render the image in each comparative view can be different, based not only on a different spatial scale but also on different spatial and planning contexts.

A zoomed in view (View A) shows details at the level of individual trees, roads, and houses, for example. The zoomed in view can show significant, local scale detail as overlays such as housing density, informal settlements, development nodes, etc. A companion, synchronized view at a zoomed out scale (View A) shows the river system, major roads, proposed regional developments, and other larger scale overlays.

The comparative spatial comparison tool thus juxtaposes two (or more) views together in a spatial synchronization on one or more displays. What is shown in each comparative view is based on inter-relationships defined in the organizational framework at different factor scopes/scales, different topical information available, and problem-solution and factor-effect relationships between the displayed views (and outside the displayed views at higher and lower levels not shown).

Figure 9:
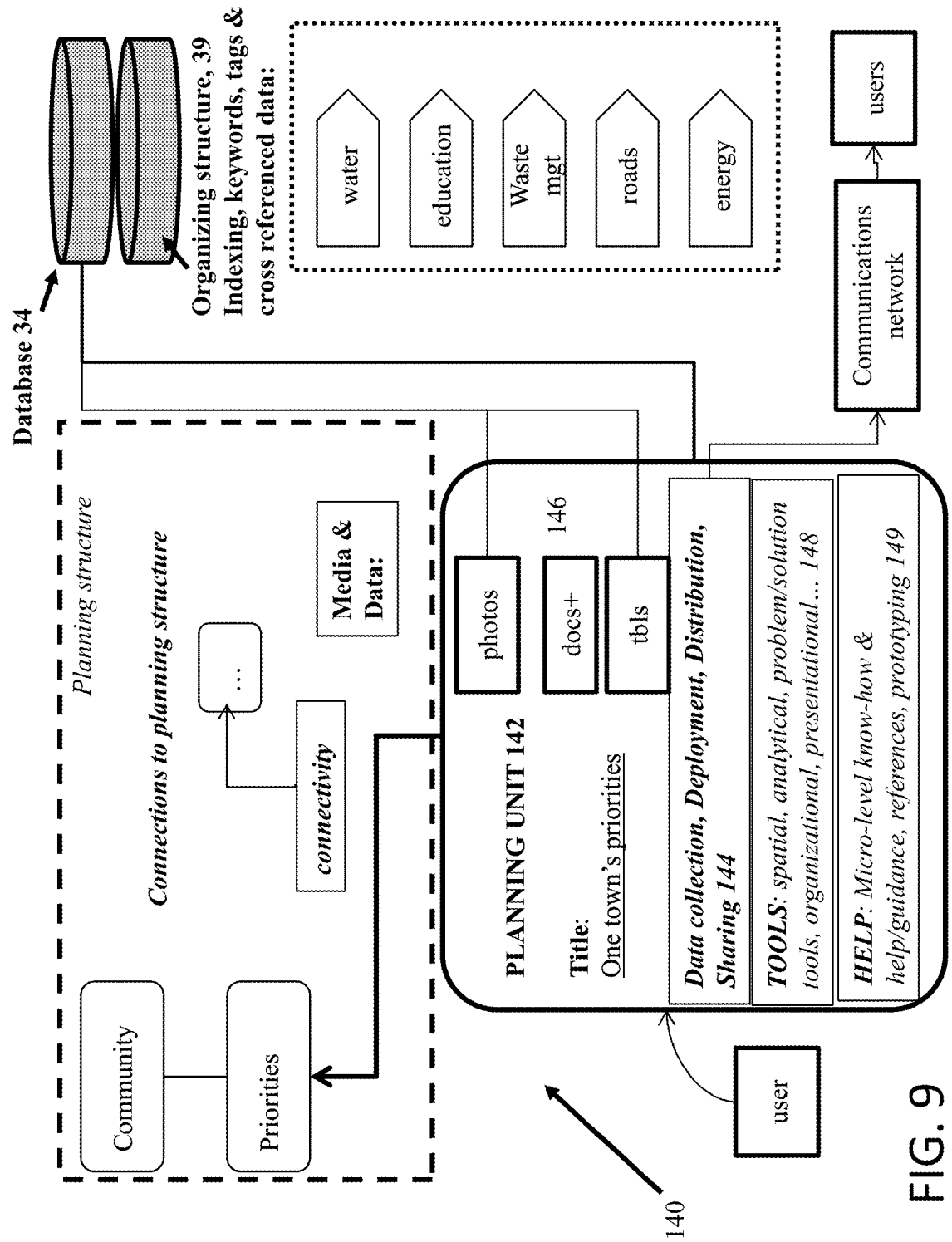
FIG. 9 shows a block diagram of a Smart unit.

Referring now to FIG. 9, a smart planning unit tool is shown 140 at different visual scales, with different topical information available. A smart planning unit tool 140 is a software-based planning object instantiated and attached to the organizational structure (e.g. the hierarchy). At early stages of a project, when the organizational structure is being developed by the planning system, the planning units 142 are provided in the organizational structure 39 as placeholders for future activity and data collection. As a planning project progresses and the organizational structure 39 becomes more defined and planning units, e.g., unit 142, grow in number and definition the placeholders in the organizational structure 39 are populated with information. The smart planning unit tool 140 is an object in the planning organizational structure. The smart planning unit tool object initially is an empty object or can have prototype data. The spatial, analytical, and organizational tools discussed above are used at the individual unit level as well as among units to populate this initial empty prototype data is contained in or retrieved by the programming object.

Each smart planning unit 142 includes basic features of functions 144, e.g., behavior of the smart planning unit.

While smart planning units can be "smart" in various ways, such as with expert knowledge/information that is stored, retrieved, or templated for further use instances, the use of the term "smart" refers to the functional features of the smart unit that the unit has connectivity functionality with the organizing framework and with other planning units and topics. The smart planning units have tool enabled "smartness," so that a smart planning unit for, e.g., surveys utilizes tools and external resources to produce, disseminate, collect, and analyze survey data. The smart planning units have help for subsequent users by prior use examples and functionality for distribution of results of application of the smart planning units.

This "smartness" differs from (but also can use) object programming inheritance and default values, and structure data required by the smart planning unit to fit into the organizing framework structure 39. Each smart planning unit includes functions and data are have default values to fit into the organizing framework structure 39. The smart planning units are "smart" in that they can contain expert information passed on from prior use. An expert can construct a unit that has default properties and values, links to external resources, examples and help information for the user to gather data, understand a problem, in order for the user to proceed in the spatial planning process. One goal is for the "tool" via each planning node to pass on expert know-how to the less experienced user.

The smart planning units include prototype internal structure, data (by-example), help 149, tools 148, and the function(s) 144. For example, adding a planning unit for "Survey of Needs" invoke survey tools and other social inclusion tools; show how-to guides on conducting surveys; connect up to survey data in the database; and help formulate the survey, disseminate it through channels including SMS messaging, web media, and tabulate results. In contrast, producing a planning unit "Railroad Transport" can connect itself to larger scales, use map layers related to transportation corridors, and pose transportation questions and best-practices. A survey planning unit tool, can be constructed for a survey, and starts with a user interface that allows a user to add properties such as audience, questions, topic, and etc. that the user of the survey node enters. The planning unit help for the survey can include suggestions and resources for conducting a survey. A template database can be included to tabulate results. The survey tool can have a distribution mechanism to send the questions via email or SMS (short message service) or other messaging protocols to the audience added to the survey planning tool. Each planning unit is defined with prototypical data to be entered and tools that define and use the planning unit. Tools are characterized as "data entry" tools to help fill in the data; "spatialization" tools to visualize data; "distribution" tools to collect information or distribute the information via external communication directly (e.g. message) or indirectly (posting to a site); tabulation tools to help collect and organize data; association tools to help link the unit or specific data within it to other unit/data; and "help" tools to show by example "Smartness" is characterized according to (a) connectivity, e.g., the planning unit can connect itself Smart planning units 37b have connection tools/functions that help connect a unit into the organizing framework structure 39. The connection tool references data about hierarchy or relationship of topics within the organizing framework 39 and the unit to be connected. There can be one primary connection or multiple connections (FIG. 5). Multiple topical connections can be used to search for topics and dynamically structure the units within the framework based on topical interest and audience to positions in the organizing framework structure 39 and to information based on inputs, context, and template specifications; (b) help/assistance, e.g., the planning unit can draw upon past instances of use, e.g., shareable instances of organizational connected environment to help provide know-how on its use. For example, a "town needs" unit can draw upon prior uses to prompt the user to produce a survey within the planning unit/node; (c) deployment and data collection, e.g., through deployment tools that help distribute requests for information, including across distributed and mobile networks, and receive and process information from such sources.

The smart planning units contain tools and information to aid in the collection, organization, analysis and solving of spatial planning problems. The mechanism for producing a smart planning unit includes topical collection of planning information such as maps, statistics, photographs, forming connections within an organizing structure, and forming cross-indexing of collected information to help draw upon related information and examples within and across projects, and providing deployment capabilities to distribute planning units to audiences for field data input, surveys, and presentation. The smart planning units 140 also are provided with audience permission levels that define various types of audiences and defined what tasks are performed for a given audience, including tasks such as allowing a user to add, edit, share, re-use, or merely read content from the smart planning unit. The smart planning units 140 also include software tools 148 to analyze and transform the data and to produce spatially represented and normalized data.

For example, a project in an under-developed area may not have access to expertise, such as in social inclusion. A social inclusion smart unit can be used from a toolbox library. A setup process generates a user interface that presents basic questions to a user. These questions are posed from stored examples from past uses on other projects. Reference documents can be linked to these questions and expert advice from global sources can be included. The smart unit becomes a seed template. For social inclusion, the smart help can suggest how to have town meetings and collect survey data for community needs. For an environmental protection smart unit, the unit can advise to gather site photography, and make a database and maps of local birds, animals, and plants.

Smart planning unit tools 140 are software objects with basic programmatic, spatial, and interactive capabilities that allow the software objects to be used, i.e. filled with data from within the organizing framework structure 39. The Smart planning unit tool proceeds by producing the organizing framework structure 39 planning nodes. Each planning node is assigned topics and collected data. As the planning project progresses, the organizing framework structure 39 grows, by increased number of used planning node instances, and these instances are interconnected (by topic). Built in planning tool capabilities may include: categorization and indexing of topics and data (i.e., production of metadata), data collection help, communication and distribution functions such as messaging, and spatial aggregation of disparate data.

Thus, smart planning unit tools are of various types. One type of smart planning unit tool is a "connectivity" planning unit tool that connect itself to positions in the organizing structure as described above for unit connectivity and to information based on inputs, context, and template specifications. For example, a template for social inclusion project or sub project can have a default organizational structure and default topical structure. Planning units that are added with such topics can be connected or prompted for possible connection via these templated topic/subtopic/related topics. Another type is a "smart-help/assistance" planning unit draws upon past instances of use and organizational/connected environment, as shared, to help provide know-how on its use. The Smart help tool assists the user in forming a new instance of a particular type of smart unit. The planning organizing structure and planning units are stored as data in a database. This data is indexed and selectively shared. The data can also be filtered or generalized before sharing, to protect private information. A smart unit has topics of information. These topics are index-able categories. The properties of information can also be indexed, as well as statistics on their values. The type of tools used can also be recorded and used for future reference. The connection of a unit within an organizing structure and its topical structure can also be extracted and stored. The help feature can proceed by matching a particular unit's topics and placement within prior organizing structures.

For example, a "town needs" unit can draw upon prior uses to prompt the user to produce a survey within the planning unit/node. Another type is a "smart-deployment and data collection" planning unit that through deployment tools that help distribute requests for information, via a distribution tool such as to send questions via SMS messaging to a list of audiences including across distributed and mobile networks, and receive and process information from such sources. In other words, planning units employ tools. The tools, data, connectivity within the organizing structure are recorded to help future reuse.

Figure 10:
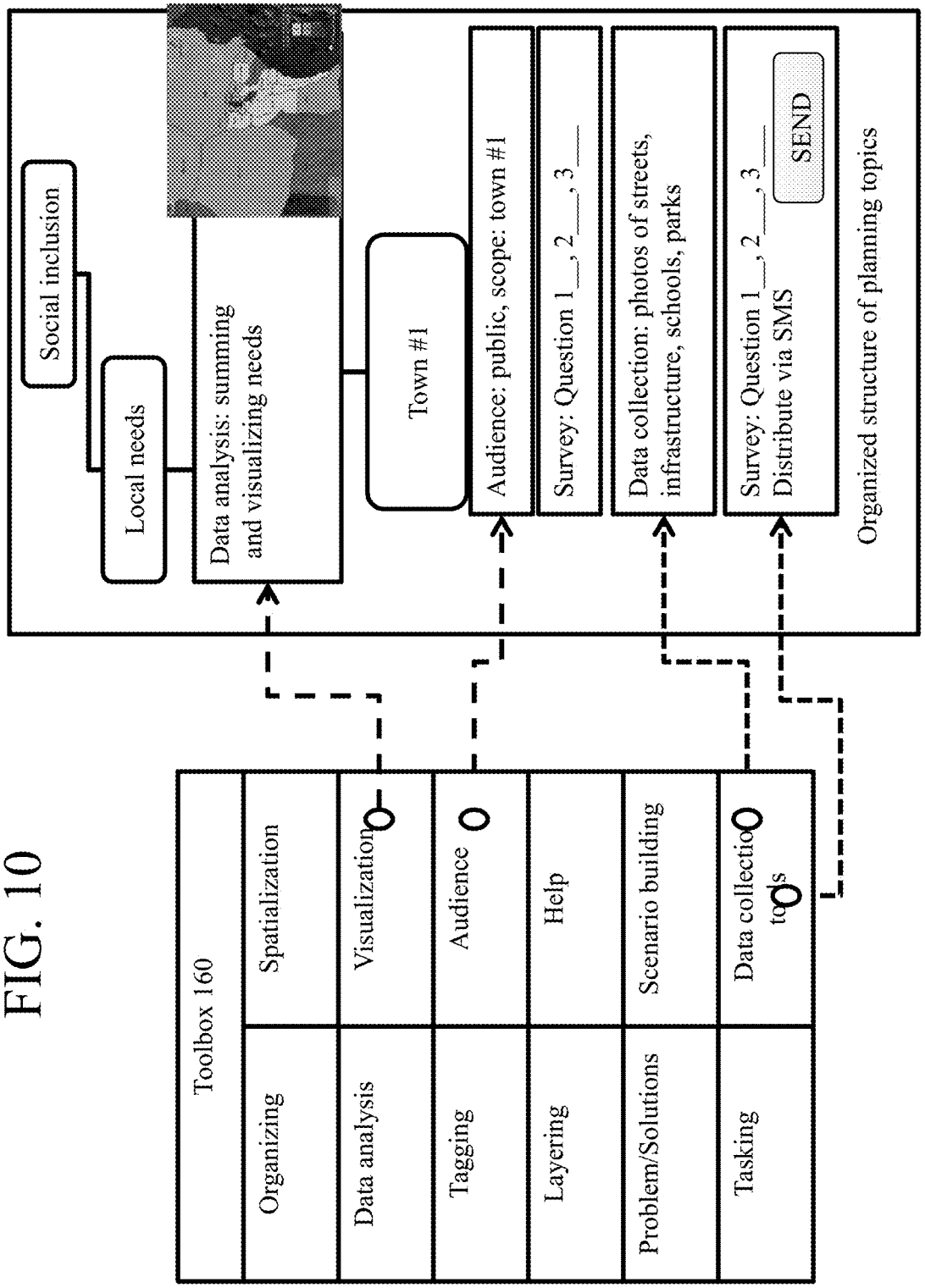
FIG. 10 shows a block diagram of Smart unit toolkit.

Referring now to FIG. 10, planning tools that assist the planning process are provided by a planning toolbox 160. Tools in the planning toolbox include organizing tools, collecting tools, visualization tools, spatialization tools, analyzing tools, tagging tools, layering tools, help tools, problem solutions tools and scenario tools. The use of the tool produces organizational structuring of the planning units (nodes). For example, a node can define an audience for a survey; define the data collection needs in terms of media, layers, and features; and define survey questions and distribution of the questions. The tools are used within the organized structure of planning topics as users develop a project, adding, editing, analyzing information within the planning topic (nodes). In the example, a piece of a hierarchy of nodes is shown, from "Social Inclusion", to "Local needs", and then to one town's local needs. The Audience tool is used to set the audience for the town, to the public within the town. A survey tool is used to develop questions. A data collection tool is used to collect, or request the collection of photos of streets, infrastructure, schools, and parks. A request can take the form of a notice on the web, on social media, or via email. The survey can be distributed via a data collection/distribution tool via SMS messaging. In the example level above, a visualization tool is used to sum up the results from town level surveys, and show the results graphically on a map. The results can be color coded or symbolically placed on a map by each town location. The audience can be contacted by various means such as SMS, email, app to view, vote, collect data or otherwise interact with the data.

Figure 11:
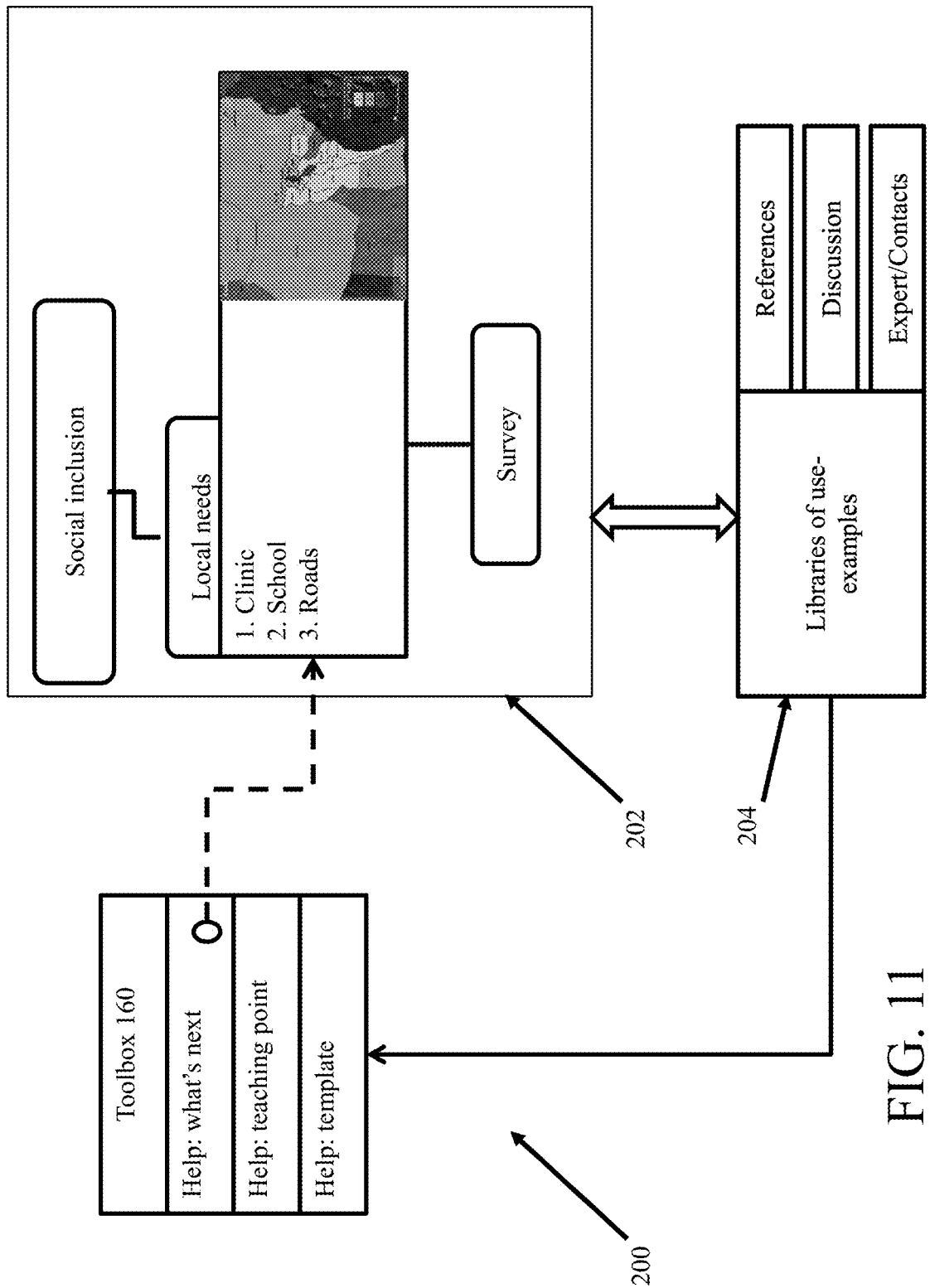
FIG. 11 shows a block diagram of Help tools.

Referring now to FIG. 11, an example portion 200 of a planning hierarchy comprised of nodes 202; a toolbox 160 of help tools to apply onto the planning nodes 202; and a database library 204 of use-examples is shown. The operator of the planning system 10 can select a help tool out of the toolbox 160 and apply the selected help tool onto a planning unit 202. The purpose of this is either to get assistance (help) to further develop a plan at this particular unit or to produce a help tool by marking a teaching point for other users. The system facilitates use and reuse of know-how by allowing users across multiple projects to mark, export, and share pieces of projects so that others can learn and improve other projects.

Any planning node 202 or structure and collection of nodes can be highlighted as a teaching point. The teaching point shows how something within one project is structured or addressed. The specific information can be removed, leaving a template skeleton for the example. Teaching point examples can be stored in a library and shared. For example, how to collect data for local needs can be made into a teaching point, so when someone on another project wants to do a similar task, it can help. The needs-help user can use the toolbox's "help: what's next" tool on a planning node. This action can invoke a search in various help-libraries by topic or keywords and structural or informational similarities. A teaching point and a template example, if found, can then guide the (novice) user to next steps, by example. In this example, a teaching point might have a next step of: (1) "list towns or other sub-divisions", (2) produce sub-topic/nodes for each town, (3) produce a survey and see examples, (4) hold meetings or distribute your survey electronically, (5) use a statistical tool to collect your data, (6) show your summarized results on a map, and (7) analyze your result data.

Figure 12:
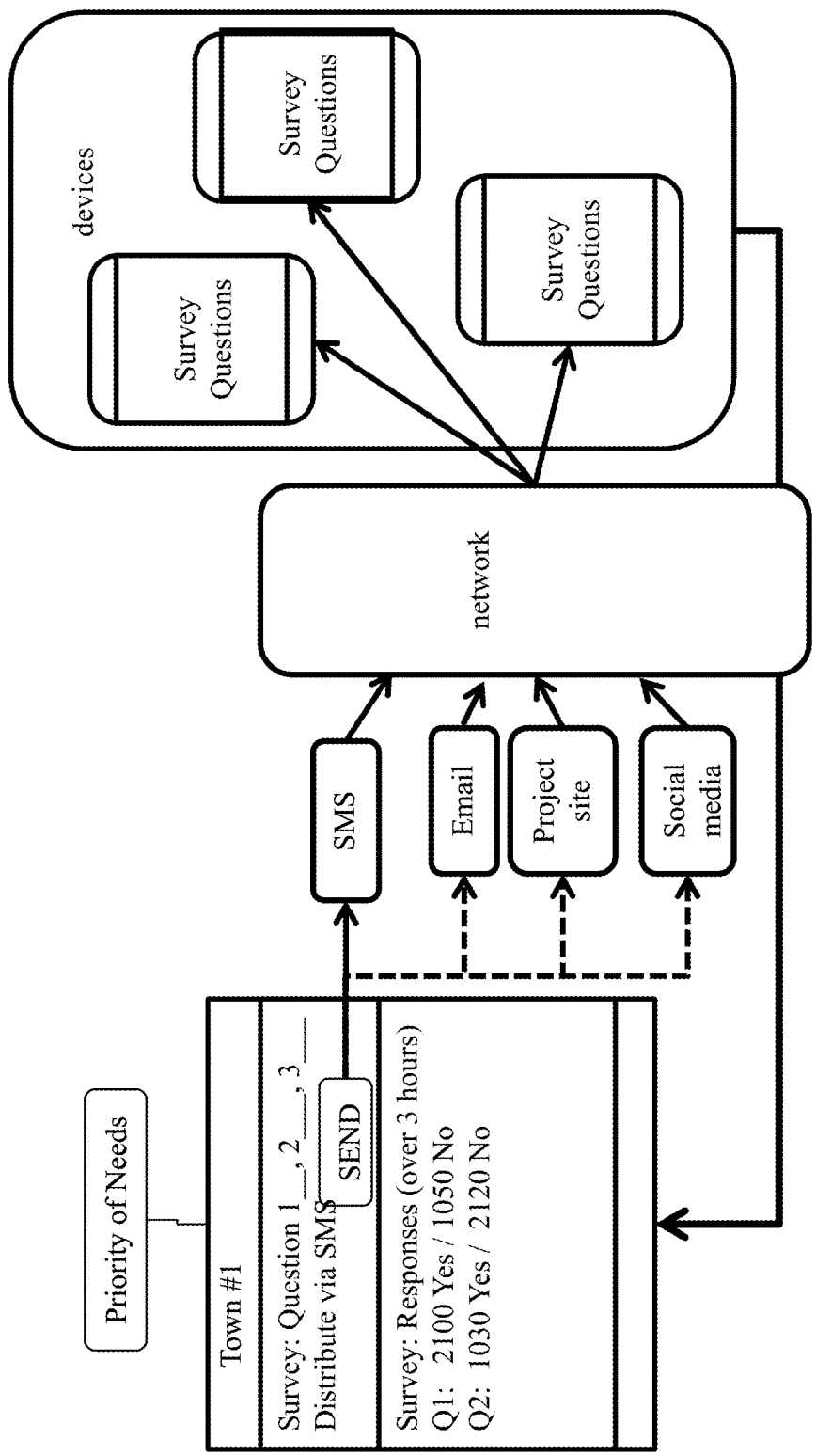
FIG. 12 shows a block diagram of Mobile distribution.

Referring now to FIG. 12 mobile distribution tools are shown. A mobile distribution tool can help send SMS messages, emails, post a web site page or post to social media. By selecting the tool for a node, such as an SMS tool, and by filling in who are the recipients, a survey, for example, can be sent via SMS messaging. The tool links back to functionality that collates and tabulates received responses. The "survey node" with the help of a SMS distribution tool and survey builder tool helps collect survey data within a planning project.

Projects can involve participants across physical distance, connected by a network, including mobile telephone networks for voice and data. Participants in the project can include not only professional planners but also government officials, engineers, and also the public or subset thereof. For example, in order to determine the needs of a town, and the prioritized importance of these needs, traditional face-to-face methods can be used, such as town meetings, voting and paper surveys.

The planning tool can extend the participation of the public into projects by using a social inclusion survey tool. A survey with questions can be produced and added to a planning node. The questionnaire can be distributed via many methods, such as printing, online interactive pages, social media sites, or alternatively the survey can be sent via email or text messaging (SMS) across a telecommunications network to mobile phone devices. The distribution destination can be inhabitants of a town or area, or town representatives, government officials, etc. Communication to the public via email and SMS messaging is used for public alert messages. In this example, the planning tool uses it for social inclusion, i.e. to involve the public in researching a planning issue that will ultimately impact the public. Reponses from various distribution channels can be tabulated and updated in (near) real time and shown within the planning system.

From the discussion above, a multi-factored planning approach involves information from a wide collection of topics and disciplines. The list may change in emphasis depending on the project, as does the availability of information. These factors play a role in many project activities, such as (1) exploring and developing the problem space (especially early on in a project); (2) data collection; (3) analysis; (4) spatial representation; (5) linking factors together both data-wise, problem solving wise, and spatially; (6) identification of problems and posing of solution options; (7) proposing and designing interventions; and (8) presenting, organizing and representing the project in terms of its information, analysis and results.

Factors impinge on the three activities of presentation, organization and analysis. Multi-factored information may be spatially represented and layered representations may be compared side by side. Representations will be of different spatial and factor scope with mixtures of data in terms of speculative, prospective scenarios and designs along with physical and analytical data. The organizing of the multi-factored planning projects outline topics as topics arise during a project and the organizing framework structure 39 takes the form of a hierarchy of topics. Other structures are possible both as an interface and as an internal representation, including list oriented, object oriented and relational structures. Storage of the data in the organizing framework structure 39 may be distributed.

Figure 13A:
Figure 13B:
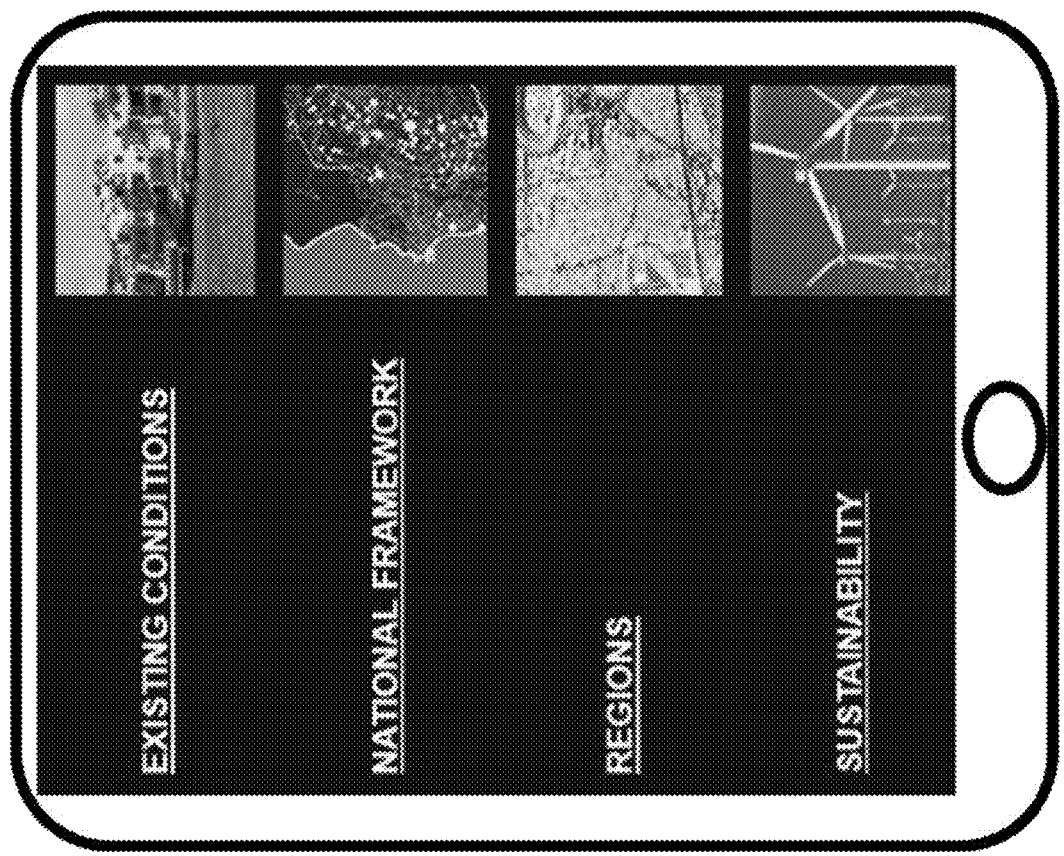
Figure 13C:
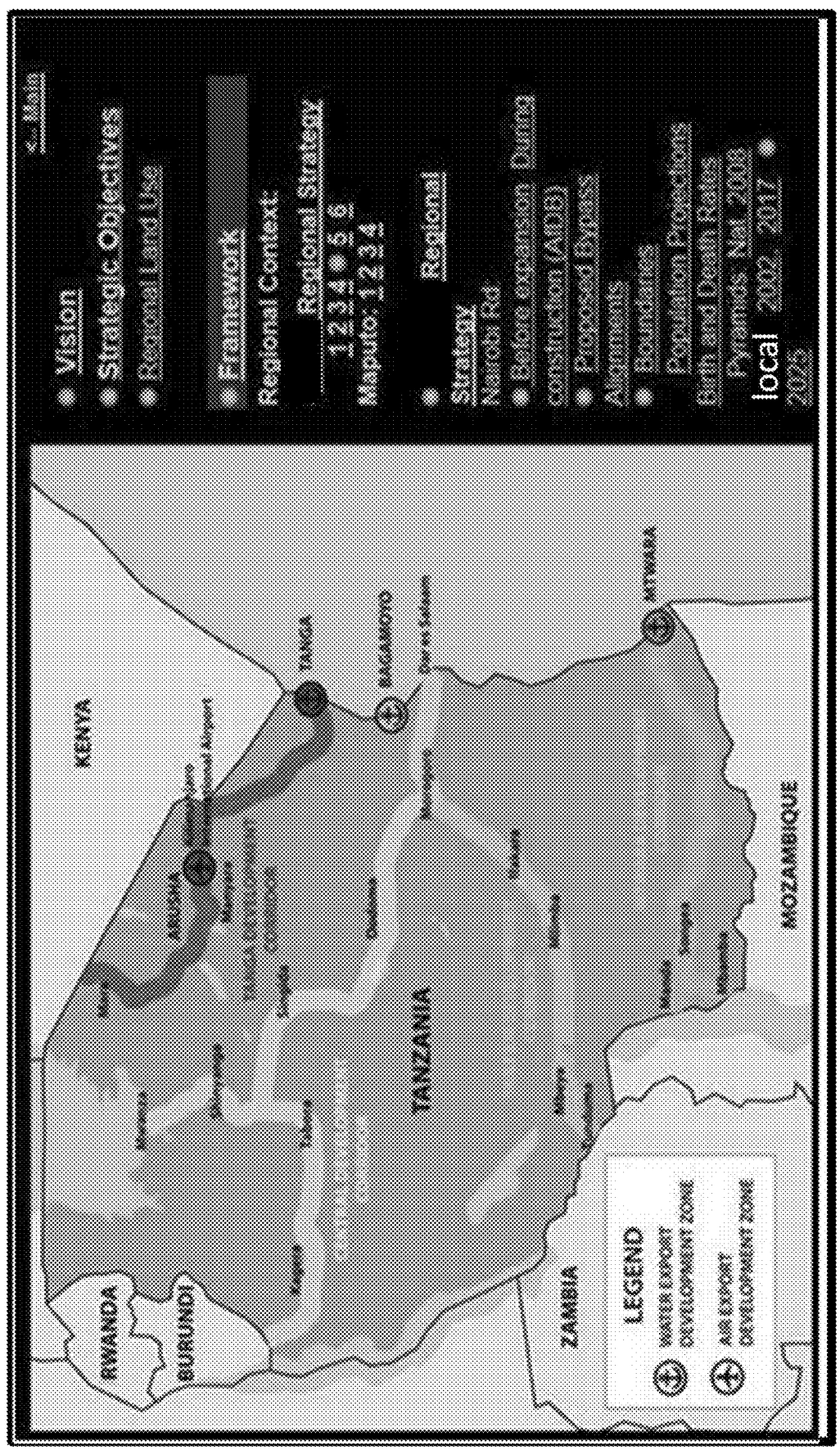
Figure 13D:
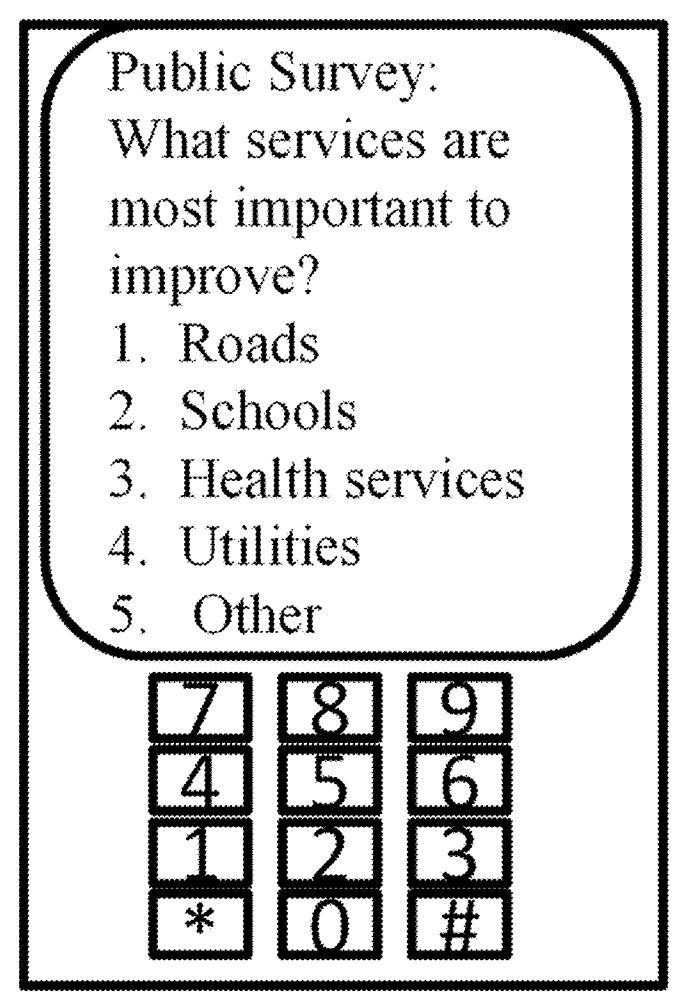

Referring now to FIG. 13A to 13D, examples of user interfaces for topical organizing structures that are rendered on user display devices (see FIG. 13A). Four examples of interfaces are shown, and these examples include as in FIG. 13A, a top level project depicting main planning areas suitable for a monitor, a top level depiction of a project suitable for a smartphone display, as in FIG. 13B, a page suitable for a monitor for rendering the organizing framework that includes a map of a planning region and topics that are linked to further information as in FIG. 13C, and a display rendered on a mobile phone as in FIG. 13D, including a survey question that is answered with a number selection.

Figure 14A:
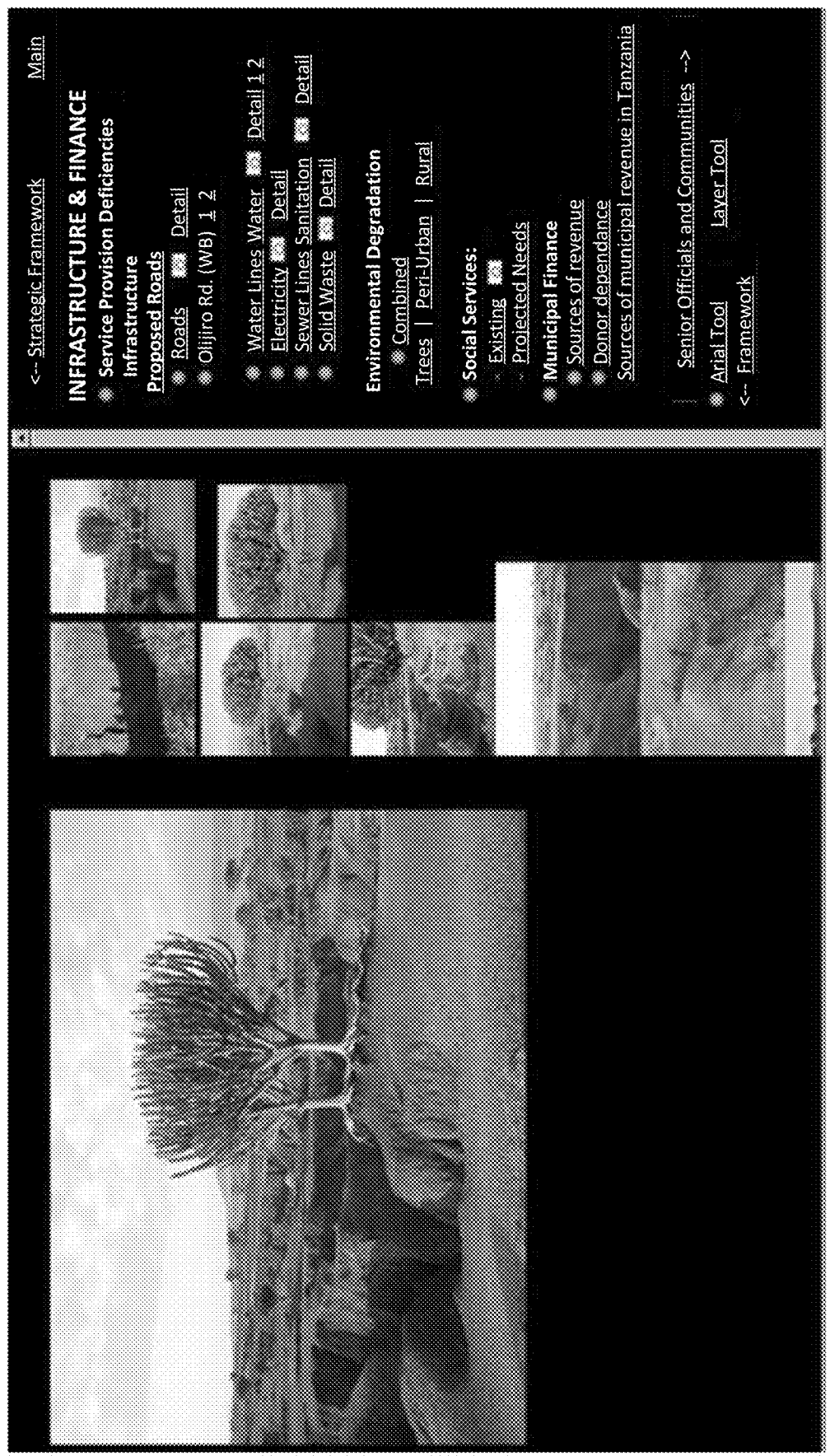
FIGS. 14A-14D show additional screenshot examples of user interfaces.

The following figures show further examples:

FIG. 14A is an example of a user interface that depicts infrastructure and existing environmental conditions and site photography for a particular site. The example page depicts in a panel the organizing framework topics of infrastructure and finance. Each topics is a link that accesses the organizing framework to render related information that is depicted to its side when selected. The image gallery is "environmental degradation," showing site photos of existing environmental conditions at the particular site. These photos and data can be collected by team members or the public. Using smart planning units within the topical organizing structure, the smart units accept and collect this information including the site photography from varied sources as the data becomes available, stores it in the organizing framework, and presents the data through the system, where the data, e.g., the site photos of environmental conditions can be commented on.

Figure 14B:
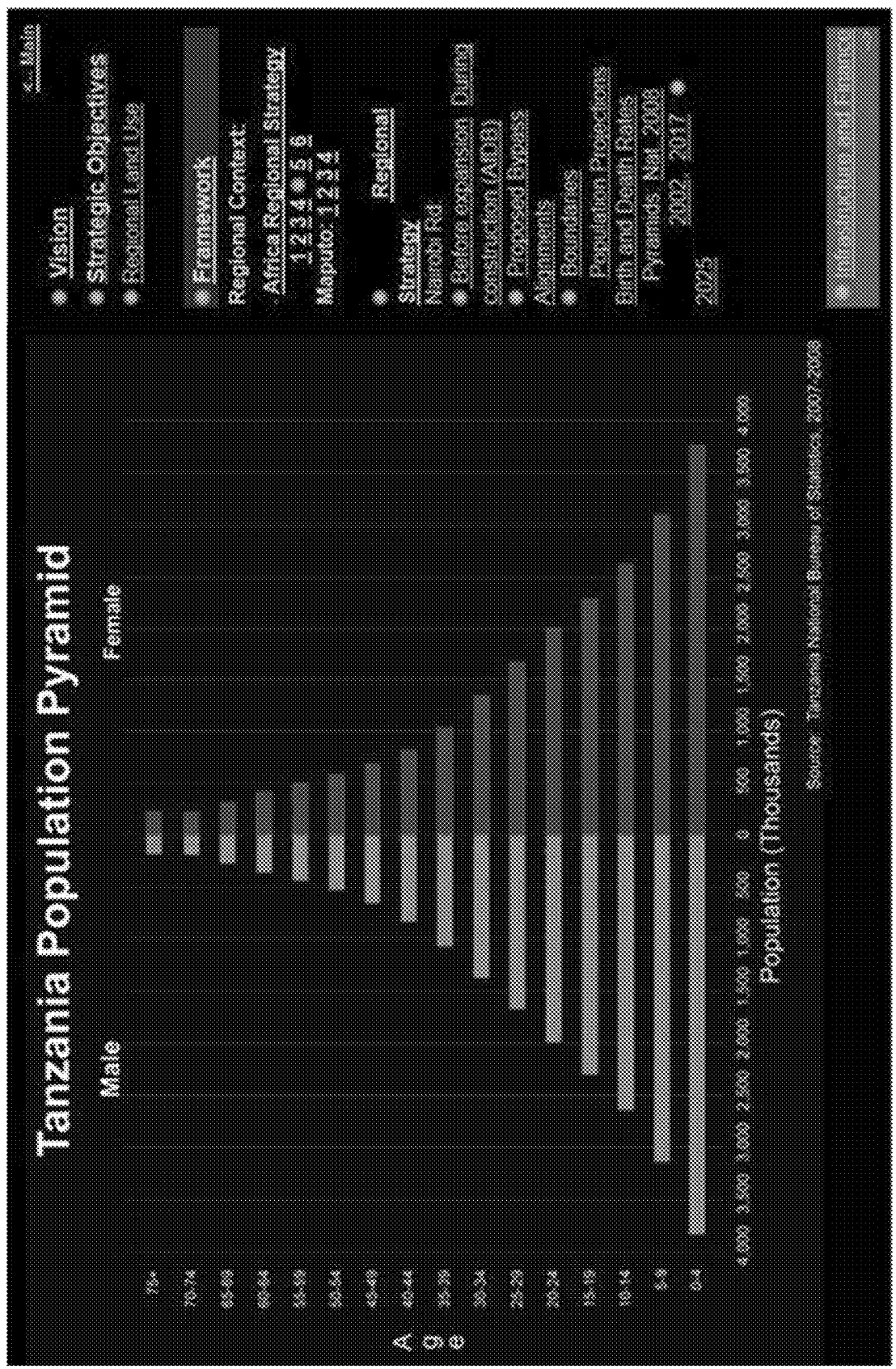

FIG. 14B is an example of a user interface that depicts regional strategy and supporting information. This example shows numerical statistical data for population as depicted in a population pyramid graph. The graph is produced from data collected and analyzed in the strategic planning framework. The sidebar topics under strategic planning framework can be selected and the accompanying data shown to its side.

Figure 14C:
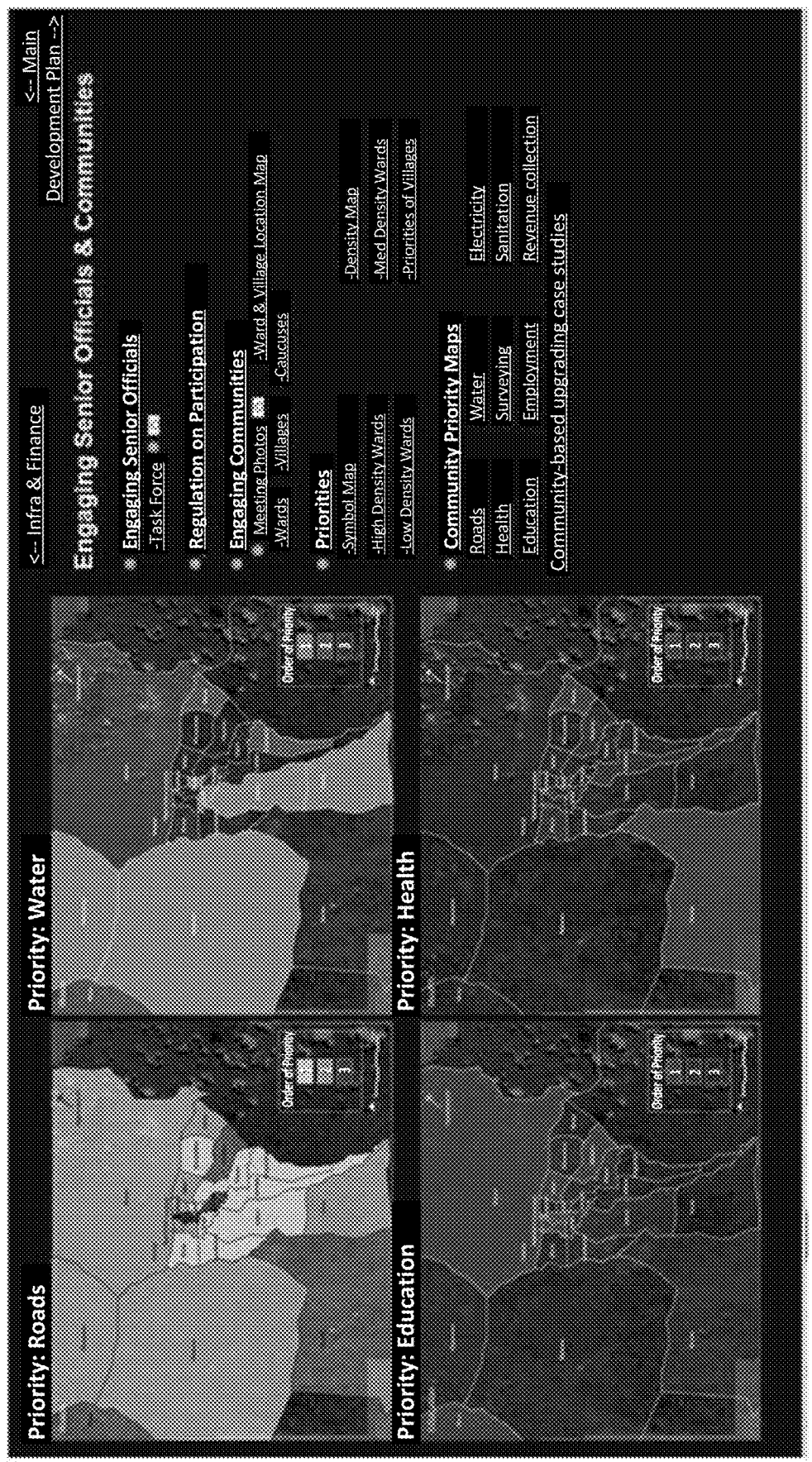

FIG. 14C is an example of a user interface that depicts social inclusion, spatialized survey results. This screen shows social inclusion data where survey results from communities are mapped spatially. Communities can be surveyed and vote on priorities that go into the decision making process. Engaging communities can proceed by face to face meetings and by electronic means including sharing the planning system to the public, as shown in a prior mobile device interface figure where questions are asked and responded to via mobile phone. The spatial representation of survey results can be shown dynamically and in real time, to audiences such as government officials, decision makers, project members and the public.

Figure 14D:

FIG. 14D is another example of a user interface that depicts results of the comparative zoom tool. In this view (which is similar to FIG. 8), the planning system causes the one or more displays to render side by side comparative maps, where each map is synchronized with the other, but can be separately zoomed in or out spatially. The layers represented on each comparative view can be different, based not only on spatial scale but rather more importantly on spatial and planning context. A zoomed in view (View A) shows details at the level of individual trees, roads, and houses, for example, can show significant local scale overlays such as housing density, informal settlements, development nodes, etc. A companion, synchronized view (View B) at a zoomed out scale can show the river system, major roads, proposed regional developments, and other larger scope overlays. Also shown in FIG. 14D is a sidebar of controls that are linked to enumeration queries. The sidebar can list various controls, such as a clear control that clears the display, a road control that highlights roads in both views, river control that highlights rivers in both views, etc.

Generally, the spatial comparison interactive tool allows two (or more) views of spatially synchronized data to be viewed and interacted with. Each view can be at a different scale, but each view will have a location in common within a range of the respective view. However, as the views are at different scales, the locations included in each view need not be identical. For example, one view can be of a city, whereas the other view can be of a county or state in which the city is located and thus the later view would include more than just the city. Each view has overlays of various topical spatially represented (or spatially mapped) data. The layers of data can be different for each view. Furthermore, different scales can highlight different types of data relevant to that scale and context. In addition, a comparative context exists between the 2 or more views, which can affect the topical layers shown. As the user interacts with the comparative view, the views change in synchrony. Changing location in one view changes the locations shown in the other view(s). Changing topics of interest can change all of the views.

The spatial comparison tool is an exploratory tool that visually renders connections and issues that exist at and between different scales of planning. Unlike simply showing different levels of detail, the system shows differing information based on spatial, topical, contextual aspects. This tool thus aids users in identification of issues, effects, problems and solutions that may arise from development. For example, (1) a river system can be shown on a regional scale, but only when zoomed in and inspected at a local scale can erosion, dry rivers, etc. be seen and recorded; (2) climate change is a global issue, but detection and measurement is at smaller scales such as local and regional levels, where water levels, shorelines, agricultural changes can be seen and measured (and be factored into issues at a larger) (3) a major transportation corridor may look proper at a large scale, but when inspected at different lower scales, may be seen to be crossing difficult erosion areas where flash flooding and erosion exist, or be impractical to settlements and commerce. The spatial comparative tool uses data drawn in from the multitude of collected data sources, organized in the organizational framework, and added to through collaboration from various users that renders in such interfaces not only physical spatial aspects but indicators of social, economic, environmental, and other dimensions at multiple scales and contexts.

The spatial comparison tool enables uses to explore, identify and possibly act on issues that cross many boundaries whether those boundaries be political, geographical, social, physical features, etc. The topics organized and built up in the organizing framework provide the data inputs to the comparative spatial comparison tool as topics, stress factors, effects, problems, solutions, etc. that are relevant at different scales. The smart units are used to build and fill the organizing framework, and are used with the comparative spatial tool.

Figure 15:
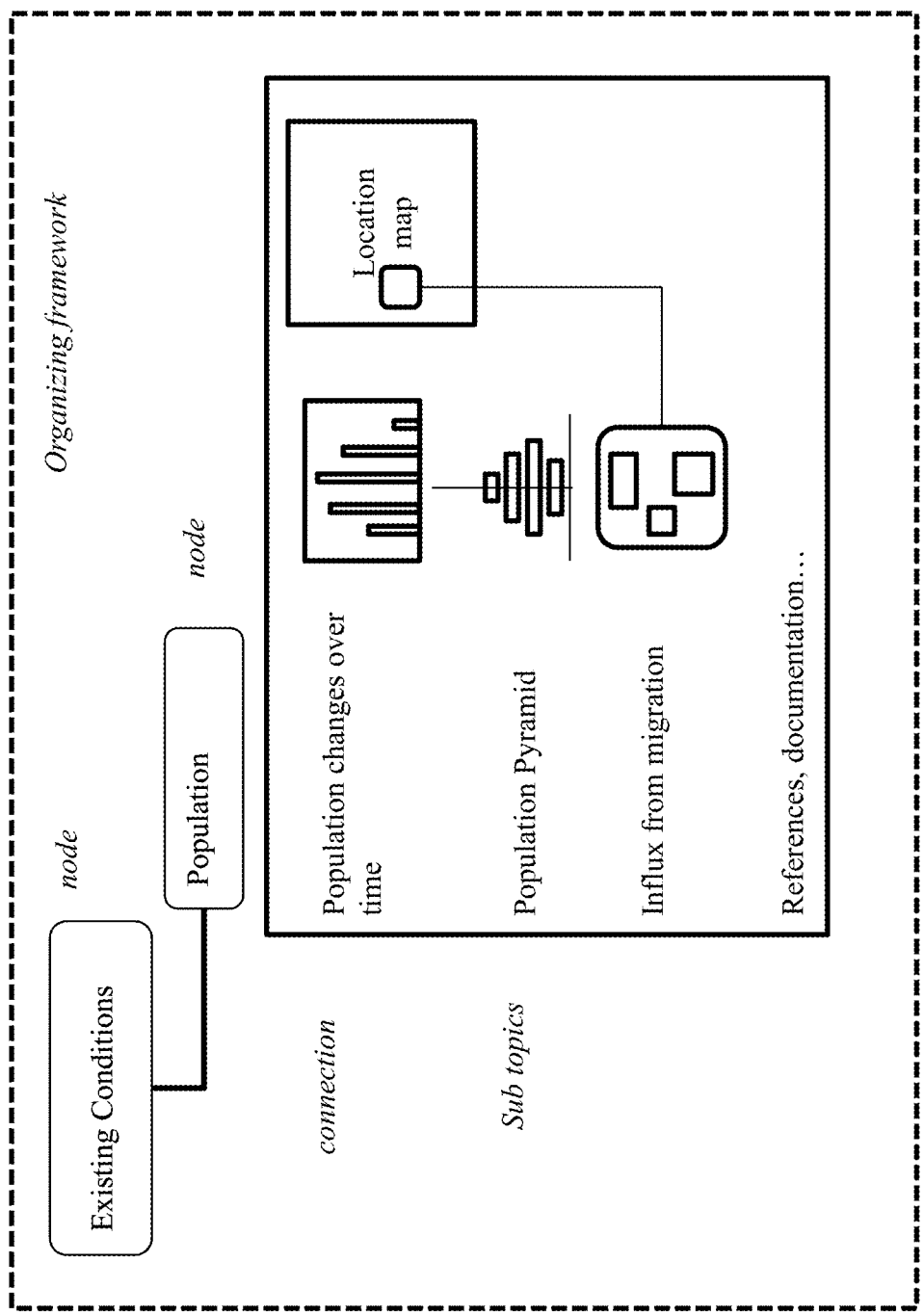
FIG. 15 shows a block diagram of planning topic/nodes.

Referring now to FIG. 15, as mentioned, the organizing framework structure 39 is an interconnection of nodes. Each node, or topical planning node, has collected information on a designated topic for that node. Each node has an audience of users who participate in constructing the information for the node, and also has users who see information collected by a node on a read-only basis. In the example, a topical node "Existing Conditions" has a sub topic, "Population". This node has various entries for population changes over time, represented by a graph; population pyramid, represented by a pyramid graph; influx of people from migration, shown (figuratively) as regions on a map. A location map places the locale in a larger context. References and further documentation are linked to the node. Each planning topic node can be considered a collection point for information. Based on how a planning topic is connected and what users have access to the planning topic determines how information is filled in and seen within the larger organizing context.

Figure 16:
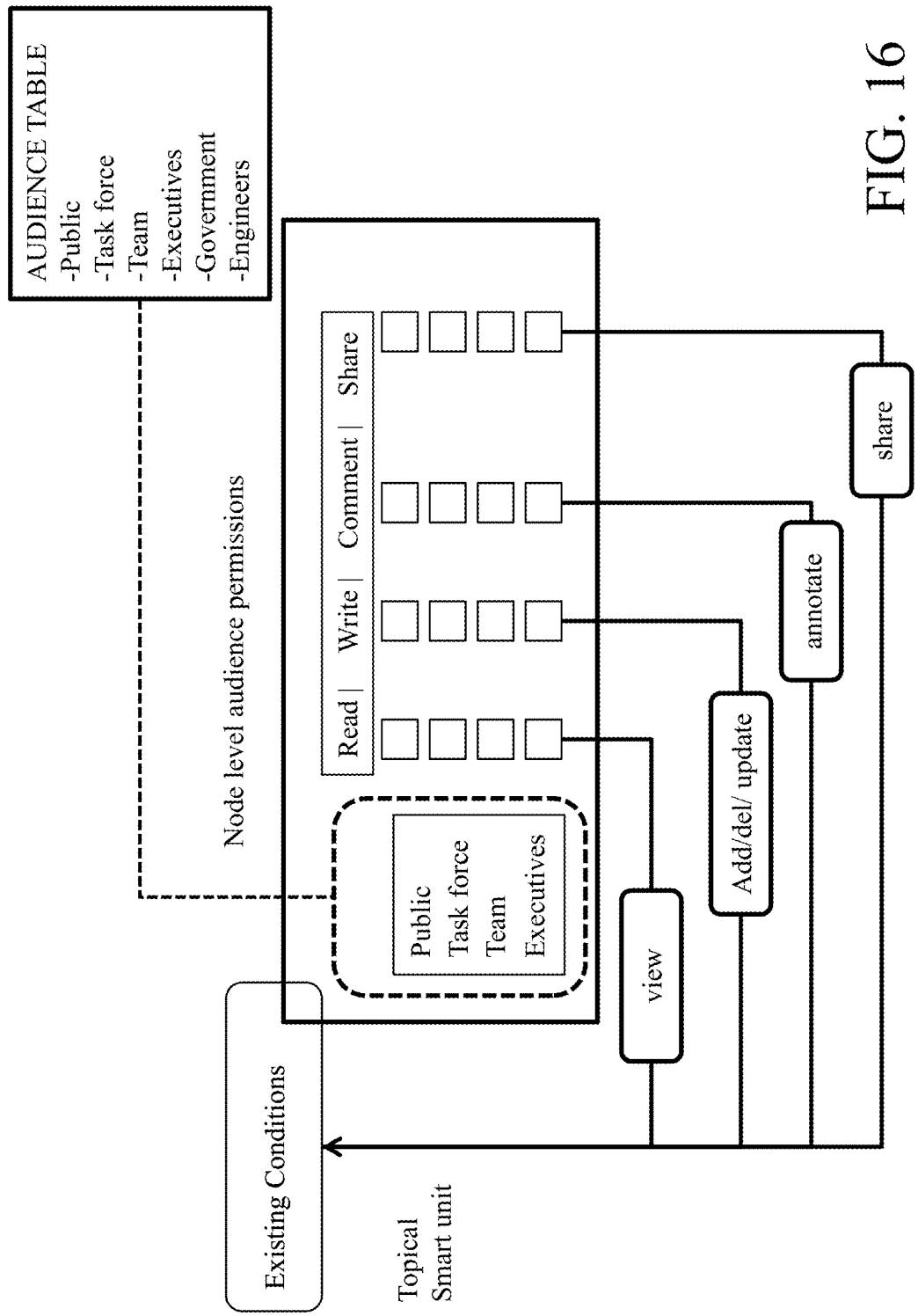
FIG. 16 shows a block diagram of audiences.

Referring now to FIG. 16, an audience and permission screen is shown. As depicted an "existing conditions" topic is shown. Each topic node can have permissions by audience type. Permissions control what groups and individuals add data, edit data, share data and access the data via a dynamically produced presentation. Permissions and sharing settings for the spatial planning tool allows the system to be accessed by many users in a distributed fashion where users have defined roles and permissions. Users can range from project team members to governmental executives, groups, and the general public. Projects can proceed with an increased degree of transparency by giving access while the project is developing.

Figure 17:
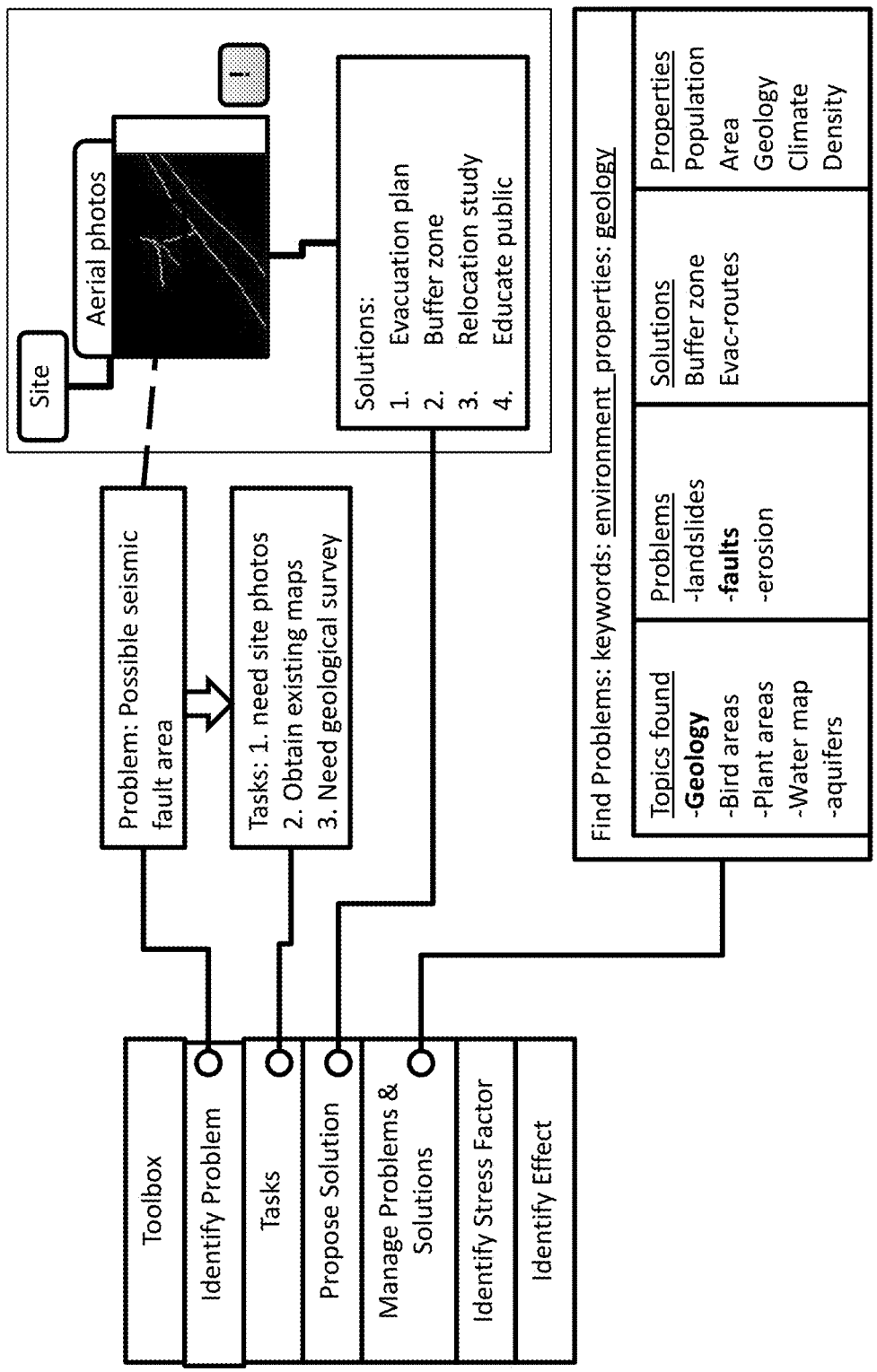
FIG. 17 shows a block diagram of problem-solution process.

Referring now to FIG. 17, use of toolbox tools is shown. The toolbox tool in this has four tools a problem identifying tool, a task tool, a propose solution tool, and a management tool. The system uses inputs from execution of these various tools from the toolbox in iterative and asynchronous manner. These tools are used to update and modify the organizational framework in the database mentioned above.

Users identify problems within project information, at any planning node level, via the toolbox tools. A first tool is a problem identification tool. The problem identification allows users to proceed with problem identification by highlighting a region on a map or photo or highlighting text or a field and marking the highlighted item as a potential issue. The problem identification tool notes what is marked, who marked it, and prompts for a title, description and optional classifications of the problem: severity, topics, etc. The same or other users, possibly distributed across a shared network at different geographic locations, classify and characterize the identified problem. A tasks tool is used to add tasks to research the identified problem.

The propose solution tool is used by users who desire to propose solutions for the identified problem. This tool accepts solutions asynchronously from various users. These users who can propose solution options might be experts in a particular field relevant to the problem. These users can be assigned different permissions in the system and thus have access to different levels of information and different levels at which solutions can be proposed.

A management tool manages the database that has the identified problem associated with the added tasks, and proposed solutions. The management tool allows users to search the database using various criteria including by user, keyword, topic, planning node, etc. A list of found entries can be displayed by topic, problems and solutions. Searching for problems and solutions within a project can help project members manage projects, find issues and add solutions. Alerts can also be setup so that users get alerts if a problem arises with particular criteria such as topic, keyword, planning node, or user.

As an example, a user browses the organized structure of planning nodes from "site" to "aerial photos" and sees a formation that looks like a geological problem. Other photos at a different, e.g., zoom in scale are rendered and depict cracks in buildings and rock formations. The Identify Problem tool is used to highlight the photo as "Possible seismic fault area." Tasks are added to the marked problem, via the task tool. The tasks include requesting more site photos, obtaining more existing maps, aerial photos, satellite images and requesting a geological survey of the area. Overtime, other project members, from field researchers, experts and the public, look at the problem and provide solution options such as an evacuation plan, production of a buffer zone, relocation plans, and educating the public on earthquakes. Users who browse the organized planning data will see problems marked, and also see solution options as they are produced. Problems and solutions can also be viewed across the project via the problem-solution management tool, which allows for searching of marked problems and solutions. For example, searching for "environment" retrieves topics including geology, which upon selection, shows problems and solutions. This is a cross-referenced or random access method of finding problems and solutions, in contrast to finding them within a browsed project structure.

The distributed collaborative aspect of the system allows an expert to aid in problem identification and tasking, and others in the field to aid in collecting data, including engaging the public. Solutions can be posed such as in the example, to produce an evacuation plan, produce a buffer zone, to have a relocation study, and to educate the public in earth quakes and faults.

Problems may be detected at different spatial scales and across seemingly disparate topics that have a collective solution. The management tool can help find topics, problems and posed solutions. Keywords and properties can be searched, within areas, within projects and between shared projects.

The planning toolbox, in conjunction with smart planning units in the organizing structure can also have a stress factor tool and an effect tool, as shown. The spatial comparison tool uses the problem-solution and factor-effect information to help identify, record, analyze, and show issues that exist between different scopes, factors, and topics.

Figure 18:
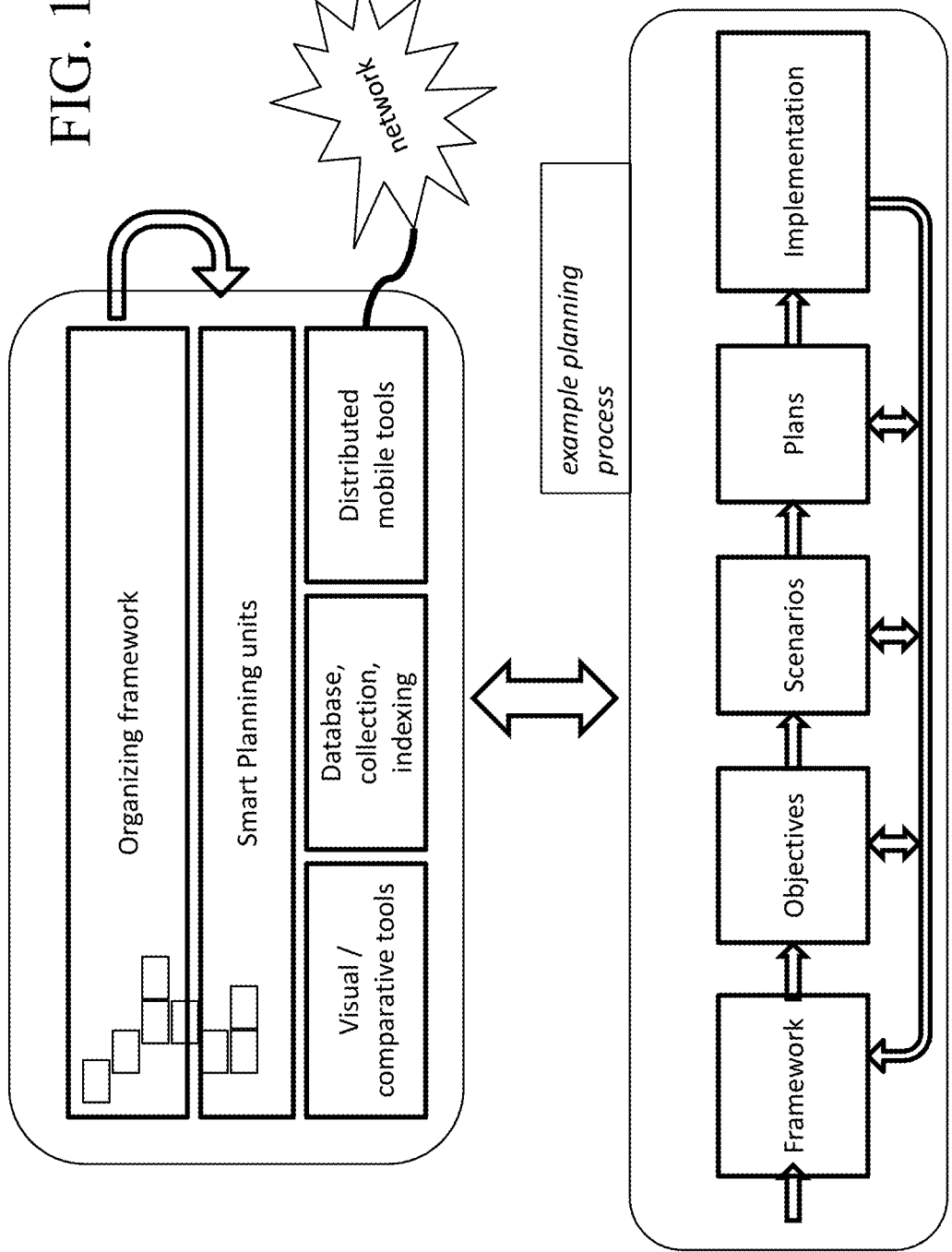
FIG. 18 shows a block diagram of tool aided system.

Referring now to FIG. 18, a logical flow of a planning process using the tool-aided planning system is shown. Conventionally, with conventional systems, a conventional planning methodology involves a multi-step iterative process of developing the planning framework, the conceptual approach, scenarios, plans and then implementations. At each stage, there can be an iterative return to any prior step in order to tune the results and account for further issues.

The planning process with the tool-aided planning system described herein may have the same flow, except that the tool-aided planning system records information for the entire project as the project evolves. The organizing framework grows and evolves along with the project. Different aspects of the project become active and available to different audiences as the project moves forward from data collection through to analysis and design proposals. The described smart planning units grow in information, detail and complexity as they fill out the topical planning nodes of the organizing framework.

Visual comparative tools are used throughout the process to "see" what the available data tells at early stages, when one needs to collect more information and define the problems, and later stages, when one needs to compare, critique and tune proposed solutions and scenarios before they are presented for implementation. Furthermore, the comparative spatial comparison tool provides advantages to users that aid users planning. For example, uses in a planning process can "comparative visualize" through the comparative spatial comparison tool how planning at one scale, affects planning or causes issues at a different scale. The tool allows users to visualize aspects of design and planning at many simultaneous spatial and factorial levels, such as patterns that are only evident when looking at a local-and-regional level across many issues.

For projects that are geographically distributed and where expertise is a limited resource, the "smart" planning units are useful to draw upon past know-how and references in helping projects move forward. The database that collects, indexes and cross-references all the information, participants at different levels of expertise, focus, and distributiveness, can asynchronously interact with the planning system. The distributed mobile tools add the ability to dynamically connect with a larger participant pool (at large), via mobile personal devices to, for example, survey public opinion, or show progress. The system breaks the normal bounds of planning both in its computational, spatial and informational structure, granularity, and dynamic possibilities for wide scale involvement.

Planning is fundamentally spatial but also multi-dimensional, complex, dynamic, and creative. User decisions are made with reference to a context. Visual displays of an environment that will be affected by such decisions can aid users in making better decisions with respect to what actions are to take place. This entails the production of a composite image displaying those attributes that are relevant to frame the user's analysis of a problem. The ability to test the relative importance of attributes through visualization lies at the core of this creative thinking process, analytical assessments and the imagined future scenarios.

For example, deciding on the alignment of a new intercity highway considers categories of relevant attributes such as physical attributes, spatial attributes, social-economic attributes, and attributes of strategic locations. These categories of attributes can be further subdivided into subcategories as in the table shown below:

| Category | Examples |
| --- | --- |
| physical attributes | Topography, hydrology, geophysical characteristics, ecosystems, ground cover, flora, fauna. conservation areas, protected sites |
| spatial attributes | population centers, facilities and services points, links to the network |
| socio-economic attributes | unemployment/employment, poverty/income demography, economic growth sectors |
| attributes of strategic locations | Edge conditions, street network access Buildings. traffic flows, Intermodal connection points |

The characterization of spatial planning as a multi-dimensional and complex creative activity is not universally accepted. In some circles, spatial planning focuses primarily on physical structure. The presented view construes spatial planning as a broad, complex multi-dimensional endeavor that ultimately manifests in spatial physical form, but takes into account many factors. This multi-factored approach therefore must draw upon a wide variety of source information, not just visual but also numeric, statistical, and of varying degrees of precision. The table below, shows, as an example, the types of source data used to factor in particular areas. For example, physical factors may involve studying figure ground maps, road networks, transportation systems, locations of historic buildings, utility lines, public spaces, and traffic flows; while social factors may include analysis of community needs and priorities, and involve statistics, surveys, and interviews. The scale of the planning investigation can range from local, to city, rural, regional, national and international. Some issues may exist at different scales that affect other scales.

TABLE

Different Planning Factors and data sources

| Area | Project | Source Data |
| --- | --- | --- |
| Physical | Urban fabric | Figure ground (maps) |
| | | Road network (maps) |
| | | Public transportation systems (maps) |
| | | Historic buildings |
| | | Utility lines |
| | | Public spaces |
| | | Public facilities |
| | | Traffic counts/flows (statistics, turning movement diagrams for key intersections) |
| | | Maps, aerial photography, remote sensing data, photographs, lists of structures, databases, diagrams, counts, etc. |
| Social | Community needs and community priorities | Statistics, surveys, Interviews, Location maps, Photos Health, income, education, employment/unemployment/poverty |
| | Social inclusion | level (occupation statistics, maps) |
| | Social deprivation | Birth, death, infant mortality statistics Income |
| | Social disparities | Rate of growth of incomes Age structure, population growth rate |
| | Demography | |
| Economic | Economic development | GDP sectoral structure & growth rate Employment (statistics, diagrams) Trade—exports & imports Investment/FDI Employment concentration Growth nodes Tourism destinations & routes Gateway cities Transport network (intercity/ regional infrastructure) Border crossings/customs |
| | Labor Force | Labor force participation statistics Employment statistics Sex/education/age/occupation data |

TABLE-continued

Different Planning Factors and data sources

| Area | Project | Source Data |
|---|---|---|
| | Migration | Origin/destination/primary routes statistics |
| | | Skill level |
| | | Employment/occupation at destination |
| Environment | Hydrology | Temperature and precipitation trends/projections statistics |
| | | Climate projections (IPCC/regional) |
| | | Water bodies, aquifers, and river basins map |
| | | Wetlands and flood plains map |
| | | Topography map |
| | | Coastal zones map |
| | | Drainage—natural and man-made channels map |
| | | Geotectonic considerations/soils map |
| | | Land cover maps, photos |
| | | Dams, breakwaters photos |
| | | Other structures maps, photos |
| | | Green systems maps, photos |
| | | Coastal fisheries |
| | | Flora & fauna distribution maps |
| | | Conservation areas |
| | Urban systems | Roads |
| | | Water supply |
| | | Sewerage |
| | | Storm water drainage |
| | | Solid waste management & collection, transfer stations |
| | | Disposal systems (open dumps, landfills . . . ) |
| | | Energy: electric grids, renewable wind & solar farms |
| | Climate change | Floods & flash floods |
| | | Sea level rise |
| | | Droughts & heat waves |
| | | Extreme events: frequency/severity matrix |
| | | Earthquakes—disaster management |

The organizing framework process thus includes producing the organizing framework/structure 39 in the database 34 to allow project specific ability to organize data and observations including statistics, photos, diagrams, maps, and qualitative data, as well as, stakeholders input in different formats including observations and images. At this stage the significance of any of this input is not yet determined. The organizing framework structure 39 allows the configuration of the contextual environment through maps and diagrams describing the different components that shape this context, the identification of problem areas and the determination of trends. The configuration of the context is constructed through visual overlays of spatially mapped features and quantitative or qualitative attributes. This configuration not only clarifies how the visual overlays contribute individually to shaping a context but also how the visual overlays are related.

The analysis focuses on the development of scenarios of alternatives under different assumptions pertaining to user defined key factors. The impact of proposed actions being considered or under implementation can be traced through the paths (links and modes) by which changes are transmitted from one component to another throughout the context altering its features or characteristics.

Complexity

A problem/project increases in complexity as the number of components or variables in the context increase, the degree of ambiguity in interrelationships among the components or variables increase, and as the length of sequences of links and modes in a path increase. Change in any component (physical, economic, social, cultural, environmental) whether by natural causes or human formal and informal activities will have impacts that reverberate throughout the structure triggering changes in other components through the interconnections between them thereby altering the context.

As visual material is essential to promote understanding of issues, facilitate communications and stimulate participation, images of existing conditions and future scenarios allow users to see manifestations of factors influencing problems. Interactivity allows users to review the impacts of the activities they propose, and gain a new awareness of the different dimensions of contexts and challenges.

Presentations are structured to convey the information to be communicated according to the area of concern of the audience, the level of understanding, the field of action and authority the audience has to act on the issues raised. The database is represented, filtered and processed according to the particular audience. Different levels of detail, and topical emphasis may fit presentations for executives and working groups. Different audiences view different versions of the planning topic structure as a presentation ranging from, e.g., executives who have little time, may see a high level summary version, while project participants and experts might see a much more detailed view. The database with cross referenced audiences to topical nodes can serve these multiple, nonlinear views dynamically.

The system 10 (FIG. 1) executes the above described organizing framework process to store the organizing framework structure 39 in the database 34. The system provides planning tools including the tools discussed in FIG. 10. These tools are stored in storage and under program control are instantiated into memory as program instructions and data used by the processor. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory may further store software components allowing network communications and establishment of connections to the data network. The software components may, for example, include an internet protocol (IP) stack, as well as driver components for the various interfaces. Other software components suitable for establishing a connection and communicating across network will be apparent to those of ordinary skill.

The server (FIG. 1) includes one or more processing devices (e.g., microprocessors), a network interface and a memory (all shown in FIG. 1). The server may physically take the form of a rack mounted card and may be in communication with one or more operator terminals (not shown). The processor of each server acts as a controller, and is in communication with, and controls overall operation, of each server. The processor may include, or be in communication with, the memory that stores processor executable instructions controlling the overall operation of the server. Suitable software enables each server to execute the functions above.

Each server may be associated with an IP address and port(s) by which it communicates with user devices, etc. The network interface card interfaces with the network to receive incoming signals, and may for example take the form of an Ethernet network interface card (NIC). The servers may be computers, thin-clients, or the like.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors. The processor receives instructions and data from a read-only storage area or a random access storage area or both. Elements of a computer (including the server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

A number of embodiments of the invention have been described. Nevertheless, it will be understood that various modifications may be made without departing from the spirit and scope of the invention. While the methods and systems described herein are directed to the area of "planning," their applicability is broader. The organizational structures, smart units, comparative visual tools, and distributed mobile interfaces have wider applications such as in strategic planning, operations maintenance, logistics, real estate development, and other spatial-and-multi-factored/dimensional applications.

Accordingly, other embodiments are within the scope of the following claims.

What is claimed is:

1. A system comprising:
one or more processor units;
memory coupled to the one or more processor units, with the one or more processor units and the memory executing computer instructions to cause the system to:
receive planning units from a database, with the planning units being software objects having programmatic, spatial, and interactive capabilities that allow the software objects to be filled with information including statistics, photos, diagrams, maps, qualitative data, and stakeholders inputs in different formats including observations and images from an organizing framework structure stored in the database;
wherein the organizing framework structure is comprised as a framework of planning units, with the planning units being organized according to one or more of topic, scale, and spatial orientation, and with a top level of the framework being a project planning unit, and with the framework having lower level units for community sections, existing conditions, and proposed development as second level planning units;
attach a tag to the planning units; and
a comparison system that receives the tagged planning units and produces two or more synchronized visual views based on the information included in the tagged planning units at two or more different spatial scales to simultaneously view the produced two or more synchronized visual views at the two or more different spatial scales, each view from the two or more synchronized visual views comprising an overlay of one or more layers of spatially mapped data,
wherein a user-initiated movement in one view results in a corresponding relative synchronized movement in other views, the relative synchronized movement being relative to a spatial scale of a respective view and the one or more layers of spatially mapped data represented by the overlay of the respective view.

2. The system of claim 1 wherein the system attaches the tag to the organized planning units to identify and track data corresponding to one or more factors, effects, problems and solutions of a planning project.

3. The system of claim 2 further comprising instructions to cause the system to:
provide sets of controls for the two or more synchronized visual views.

4. The system of claim 3 further comprising instructions to cause the system to:
receive a selection of a control from one or more of the sets of controls;
cause the system to search for and show the one or more factors, effects, problems and/or solutions from or to the selected control.

5. The system of claim 2 wherein the data corresponding to the one or more factors, effects, problems and solutions of a planning project are derived from inputs received from a distributed network of mobile devices, wherein the distributed network of mobile devices is communicatively coupled to the framework of planning units.

6. The system of claim 2 wherein the one or more factors, effects, problems and solutions occur by machine computing.

7. The system of claim 2 wherein patterns of inter-scale factors, effects, problems, and solutions are detected and reused.

8. The system of claim 1 wherein the comparison system distributes planning data across mobile communications networks.

9. The system of claim 2 further comprising instructions to cause the system to:
   link the one or more factors to one or more of effects, problems and solutions.

10. The system of claim 9 wherein the instructions to cause the system to link the one or more factors to one or more of effects, problems and solutions, further comprise instructions to cause the system to:
   receive a user indication of objects identified by spatial location and topic; and
   the instructions to attach a tag further comprise instructions to:
   tag one of the objects as a factor;
   tag a different one of the objects as an effect; and
   link the object tagged as a factor to the object tagged as an effect.

11. The system of claim 2 wherein the planning units are prepopulated with expert information passed on from a prior use of the planning units that have default properties and values, and links to external resources.

12. The system of claim 1, wherein each of the one or more layers of spatially mapped data is configured to show different types of data based on the spatial scale of the respective view.

13. The system of claim 1, wherein the comparison system is configured to:
   generate two or more images, each image having a spatial visualization with layered information, the layered information for each image comprising one or more topical layers representing a topic of interest to the user and data related to the topic of interest; and
   synchronize the two or more images according to a spatial location common in each image, with each spatial visualization displaying (i) the layered information at the spatial scale of a respective image, (ii) a portion of data related to the topic of interest associated with the one or more topical layers of the layered information at the spatial scale of the respective image.

14. The system of claim 13, wherein when changing a view of one of the two or more images, the system is configured to:
   receive an indication to zoom in or zoom out on a first one of the two or more images; and
   in response to the indication to zoom, construct a query to corresponding layers in the organizing framework structure for available data according to context and relevance of data at the spatial scale of the zoomed image and topics relevant at the spatial scale and to the spatial scale of at least a second one of the two or more images and topical layers.

15. The system of claim 1, wherein each of the two or more synchronized visual views are configured to show a plurality of layers, wherein each layer from the plurality of layers for a respective view is configured to show visual features relevant to one or more of (i) the spatial scale of the respective view, (ii) a context of data at the spatial scale of the respective view, or (iii) a comparative context between the two or more synchronized visual views.

16. A computer implemented method comprising:
   receiving planning units from a database that stores planning units as software objects having programmatic, spatial, and interactive capabilities that allow the software objects to be filled with information including statistics, photos, diagrams, maps, qualitative data, and stakeholders inputs in different formats including observations and images from an organizing framework structure stored in the database, wherein the organizing framework structure is comprised as a framework of planning units, with the planning units being organized according to one or more of topic, scale, and spatial orientation, and with a top level of the framework being a project planning unit, and with the framework having lower level units for community sections, existing conditions, and proposed development as second level planning units;
   attaching a tag to the planning units; and
   comparing the tagged planning units by producing two or more synchronized visual views based on the information in the tagged planning units at two or more different spatial scales to simultaneously view the produced two or more synchronized visual views at the two or more different spatial scales, each view from the two or more synchronized visual views comprising an overlay of one or more layers of spatially mapped data,
   wherein a user-initiated movement in one view results in a corresponding relative synchronized movement in other views, the relative synchronized movement being relative to a spatial scale of a respective view and the one or more layers of spatially mapped data represented by the overlay of the respective view.

17. The method of claim 16 wherein attaching a tag, tags meta-data of one or more of features, factors, effects, problems and solutions by one or more of spatial location, topics, audience, and status.

18. The method of claim 16 wherein data is distributed over mobile communication networks for real-time display and input.

19. The method of claim 16 wherein the planning units assist in inter-connecting planning units based on one or more of topic, spatial location, audience, and data features.

20. The method of claim 16 wherein comparing further comprises:
   iteratively comparing the two or more synchronized visual views to detect inter-scale patterns of inter-related features, factors, effects, problems and solutions; and
   applying a highlighting identifier to the detected inter-scale patterns of inter-related features, factors, effects, problems and solutions.

* * * * *